FIG. 1b

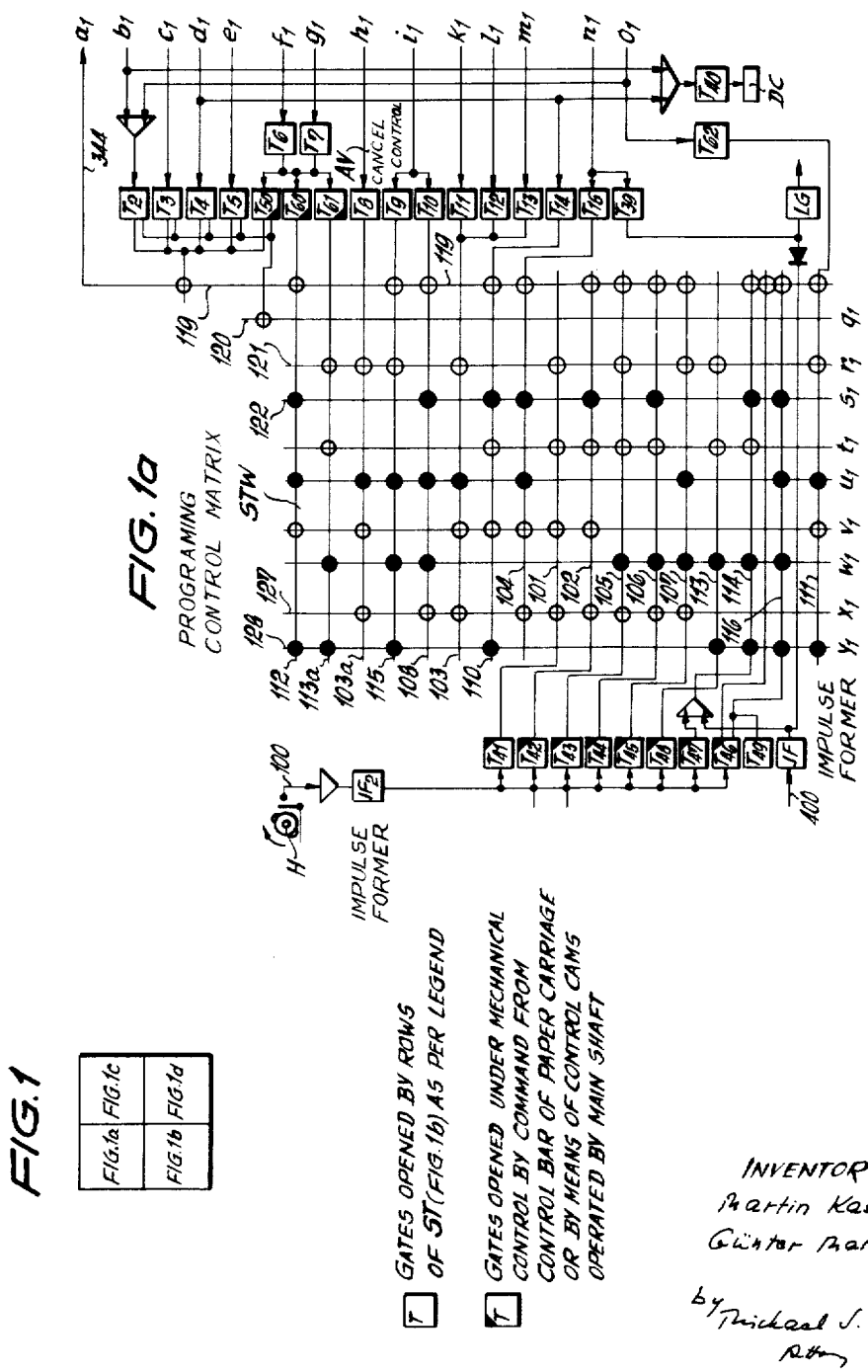

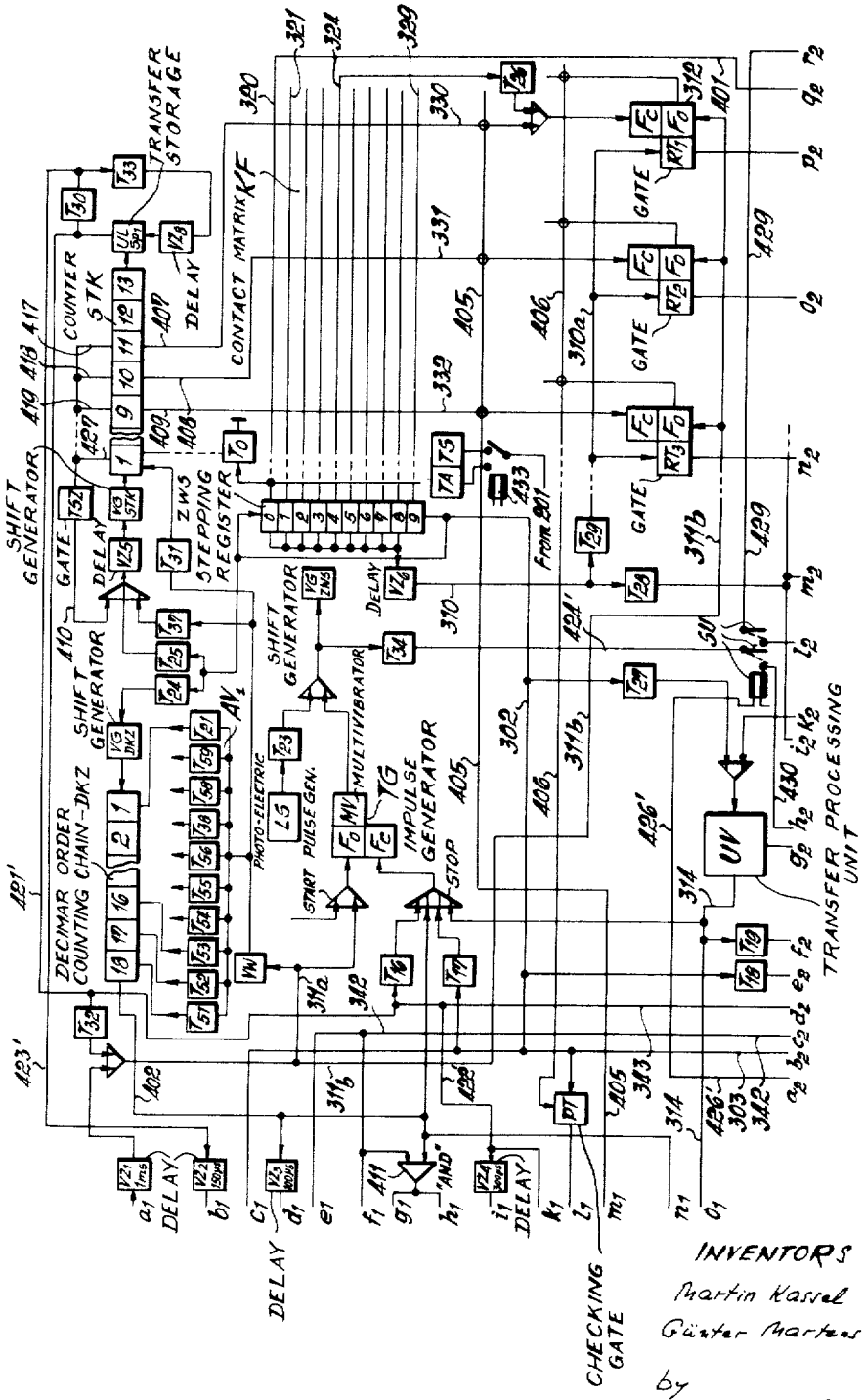

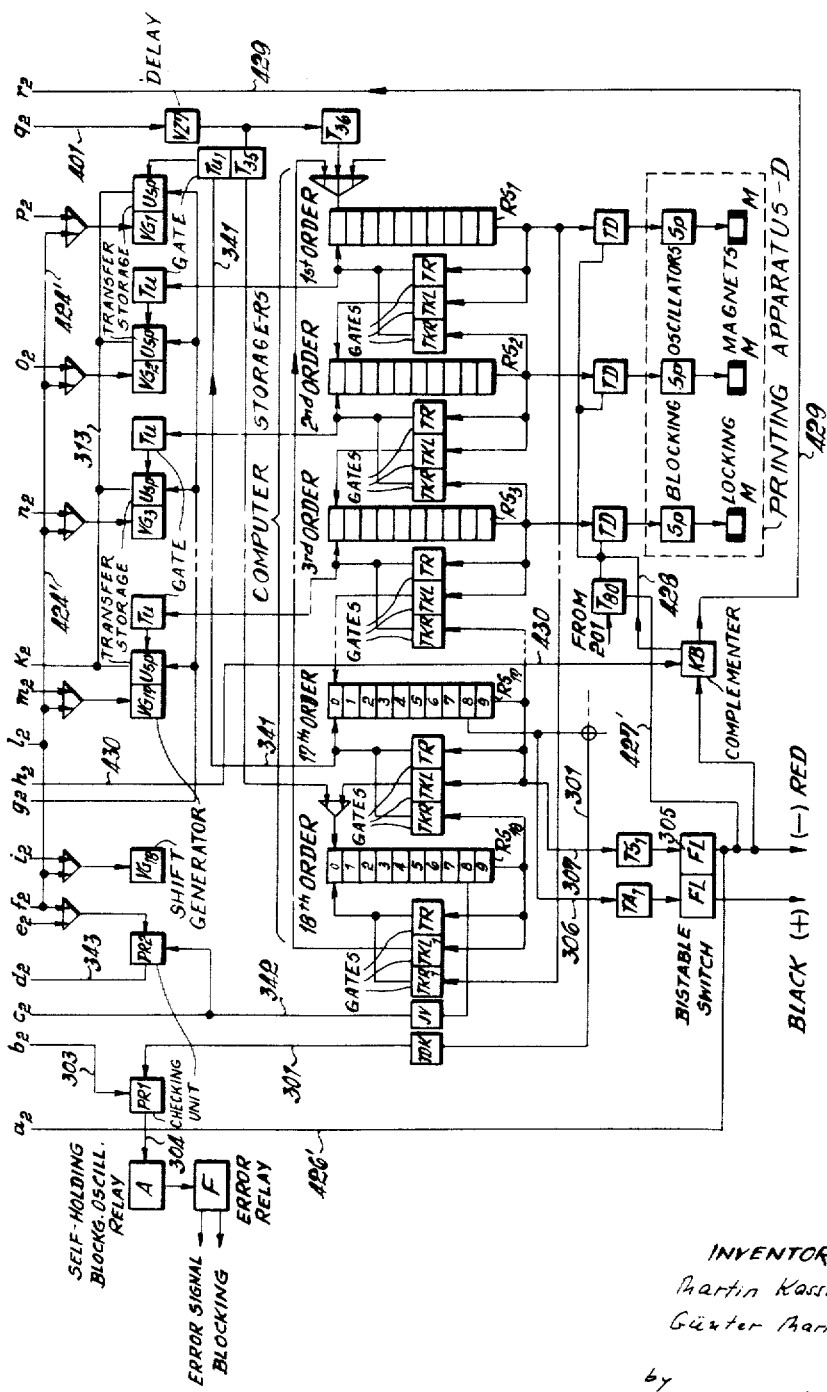

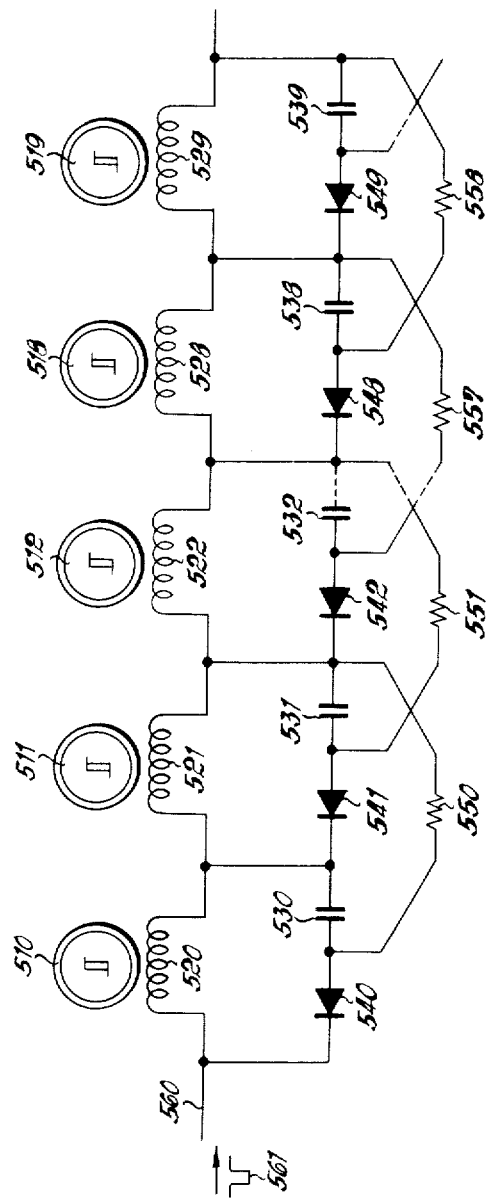

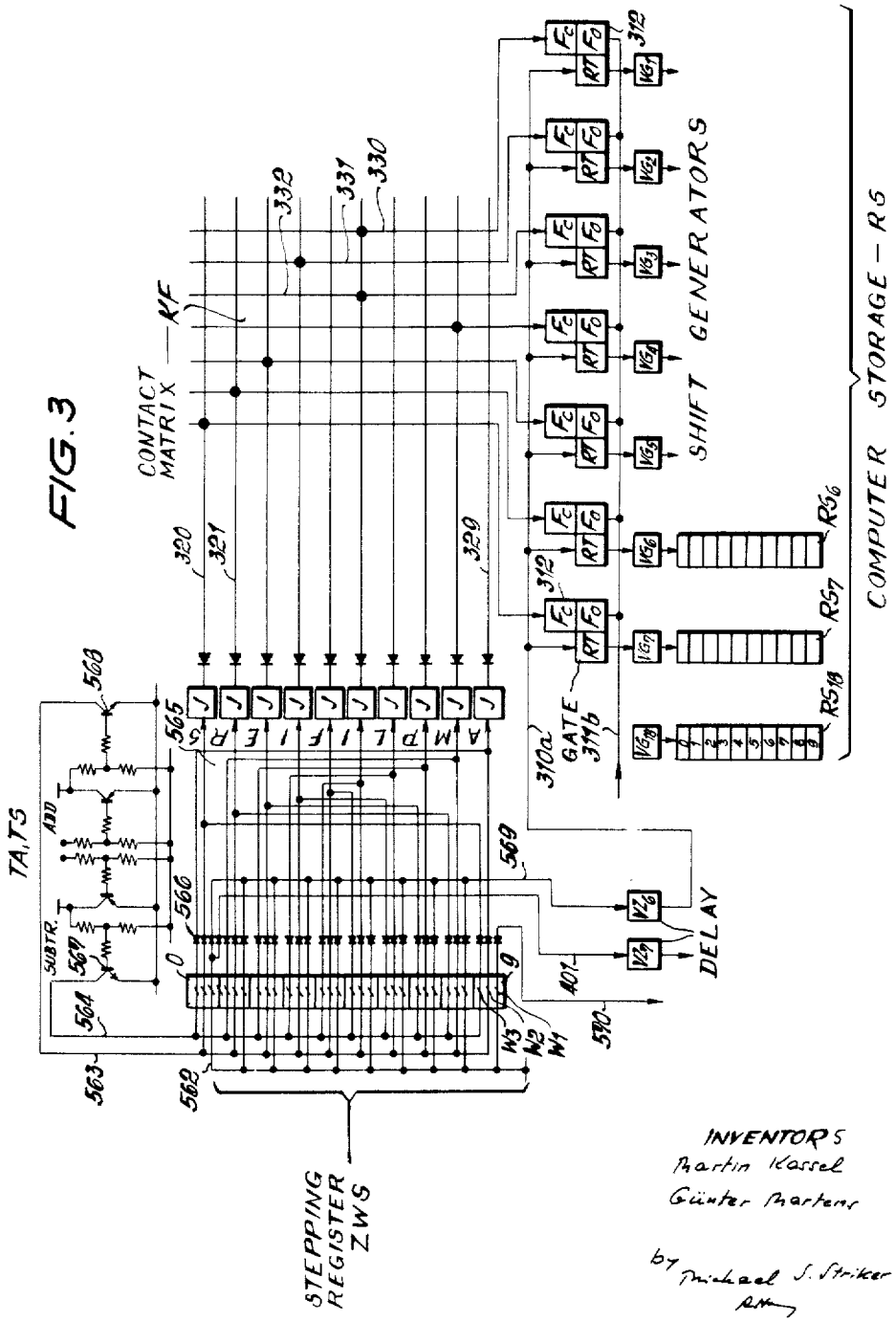

INVENTORS
Martin Kassel
Günter Martens by
Michael J. Striker
Atty.

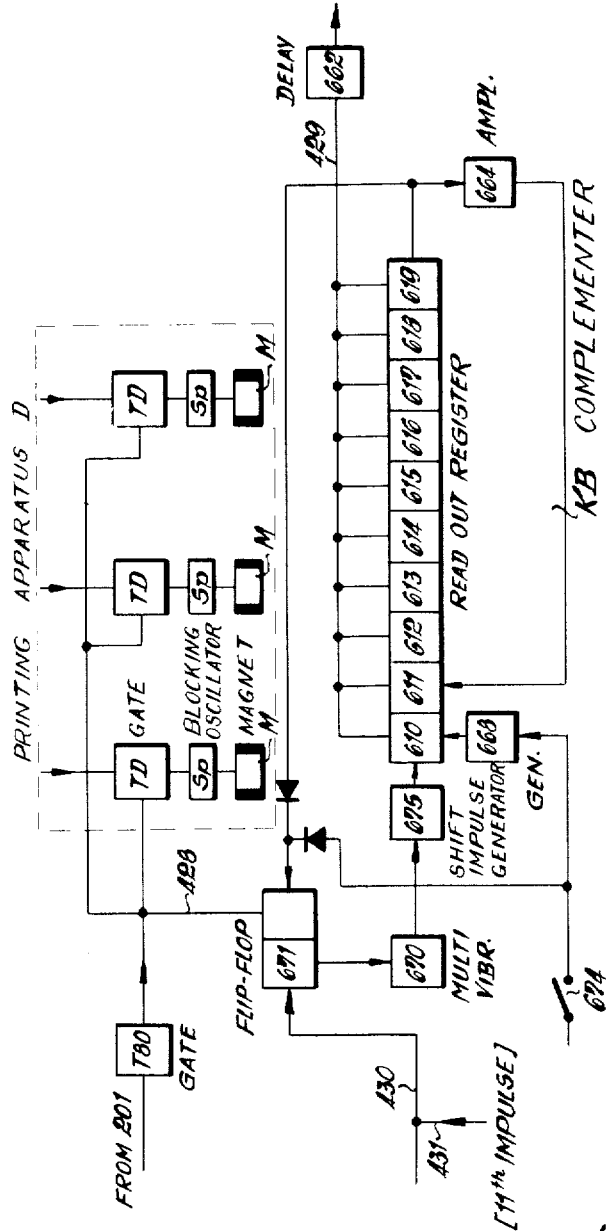

United States Patent Office 3,233,225
Patented Feb. 1, 1966

3,233,225
PROGRAMMING ARRANGEMENT FOR ELECTRONIC ACCOUNTING MACHINES
Martin Kassel, Munich-Grafelfing, and Günter Martens, Schliersee, Germany, assignors to Kienzle Apparate G.m.b.H., Villingen, Black Forest, Germany
Filed Apr. 20, 1961, Ser. No. 104,479
Claims priority, application Germany, Apr. 21, 1960,
K 40,481
51 Claims. (Cl. 340—172.5)

The present invention concerns electronically computing and electro-mechanically operated accounting machines, and more specifically a programming system for controlling the sequence and selection of a variety of accounting machine operations based on interaction between signals resulting from the accounting machine operations with a particular programming arrangement, in addition to signals or controls directly applied to such programming arrangement.

For the purpose of proper evaluation of this invention the following considerations will be helpful.

In the years past the tendency has developed to replace large and universally usable electronic computers by special arrangements of considerably smaller size and considerably lesser cost in order to open for electronic computing machines larger and wider areas of application into which the ordinary electronic computers could not be introduced alone in view of their prohibitive cost.

However, in spite of this tendency there exists still a great gap between the well-known large universal computers and conventional mechanical calculating and accounting machines which are widely used in industry, commerce and other branches of business. On the other hand, these conventional mechanical machines have a rather limited functional capability. For instance, mechanical accounting machines are usually only capable of carrying out additions and subtractions. Multiplication which would be highly desirable can be carried out mechanically but only in a most unsatisfactory manner because the time required for carrying out such a multiplication operation is rather long and the mechanical devices required therefore are comparatively involved.

Consequently, attempts have been made lately to introduce electronic arrangements into accounting machines. In doing this it is necessary to take into consideration in what manner the well-known large computers and conventional accounting machines differ from each other fundamentally, and in what manner they are similar to each other. A feature of similarity resides in the fact that both types of equipment are designed to receive digital information and to process such information in accordance with certain programs whereafter the results of computations are to be delivered in written or printed form.

On the other hand, electronically operating accounting machines have developed in a characteristic manner which leads to a typical difference from the character of electronic large computers. For instance, it would be unthinkable to provide a large electronic computer without equipping it with an electronic programming arrangement, while an accounting machine in a simple case could operate satisfactorily if it is only equipped with a complementary electronic computing portion, e.g. a multiplying device or an electronic storage for automatically storing transfers, results or partial results, without requiring an electronic programming arrangement. In such a case, the microprogramming of the accounting machine is carried out by a fixed, predetermined sequence of operational functions in the calculating apparatus itself, each operational function starting automatically the next following one according to the program.

In such a case, solely predetermined by the conventional electrical control bar of the machine and influenced by the various positions of the paper carriage, and within these positions controlled by signals derived from individual accounting machine operation cycles, within each column of the bookkeepng work an electronic sequence of functions, or a sequence of partial functions, can take place automatically in the computing arrangement without the requirement of a programming section. In such cases both the electronic introduction of a program for the computing operations into an electronic programming storage and also any substantial microprogramming in connection with an internal electronic instruction register are avoided. Only tokens of this type of control remain in the form of a set of selectively settable contacts on an electrical control bar which are respectively assigned to the different columns of the accounting machine and which cooperate with corresponding sets of contacts which are arranged on the circumference of a fully revolving shaft of the input and output producing machine (accounting machine) and which during one operational cycle of this machine furnish control signals whenever the shaft passes through or reaches predetermined, although adjustable, fixed angular positions.

In a further modified or developed type of an electronic accounting machine it would be possible to provide a central, electronic programming arrangement which contains at least one control counter. This control counter will be capable of carrying out continuous sequences of instructions as well as jump instructions. It can be actuated by control signals furnished by the accounting machine depending upon its columnar positions and upon its cycles of mechanical operations, it also can shift its settings by freely counting while controlling during such shifts the electronic function in the computing, input and output sections and while being actuated again by return signals derived from such operations of the arrangement.

In due consideration of this type and sequence of operations it is advisable to distinguish in an electronically operated accounting machine of this type between a primary control arrangement, the control counter and a distributor control arrangement, these three components mainly constituting the programming arrangement. The control counter is preferably a binary electronic counting register which can be set selectively both for the start of operations and for the issuing of jump instructions. If one would cling to the historical example of program-controlled large electronic computers it would appear, on first thought, to be advisable to arrange matters in such a way that all instructions for electronic counting machines without exception are issued from or passed through such a programming arrangement.

However, on second thought, obstacles develop. In such know programming arrangements the number of unavoidable components is essentially determined by the number of logical circuits arranged on both sides of the control counter. A control counter capable of 16, 32 or 64 different internal settings comprises itself only 4, 5 or 6 flip-flops, respectively. If however such a control counter cooperates with e.g. one or several diode distributor control matrices in the form of AND-circuits, then the resulting requirement of components is as indicated further below, in accordance with the paper of Wilkes and Stringer, "Micro-Programming and the Design of the Control Circuits in an Electronic Digital Computer," published in Proc. Cambridge Philos. Soc., vol. 49 (1953), pages 230–239. The requirement of components is as follows.

In the case of:

$2^4 = 16$ instructions—Requirement:

|  | Diodes |
|---|---|
| 4×16 diodes | 64 |
| plus | |
| abt. 5×16 gate control diodes | abt. 80 |
| | abt. 144 |

$2^5 = 32$ instructions—Requirement:

| 5×32 diodes | 160 |
|---|---|
| plus | |
| abt. 5×32 gate control diodes | abt. 160 |
| | abt. 320 |

$2^6 = 64$ instructions—Requirement:

| 6×64 diodes | 384 |
|---|---|
| plus | |
| abt. 5×64 gate control diodes | abt. 320 |
| | abt. 704 |

The above components are only those which are controlled by the control counter, further logical circuits are required for controlling the control counter. As can be seen from the above chart, a strict operational control from the programming arrangement results already in the case of a small number of internal machine instructions in a tremendous increase of requirement for logical circuits as soon as the number of the computing functions of the electronic accounting machine increases as little as indicated by a requirement of $2^3$ or $2^4$ or $2^5$ internal instructions. In view of the above conditions and desires, it is one object of this invention to provide for an electronic three-species accounting machine which makes it possible to carry out with the aid of a programming arrangement having a comparatively small number of instruction settings as many operations as possible, a task which could up to now be dealt with only by providing a programming arrangement of substantially larger size and number of components.

This highly desirable result is obtained according to the invention by the adoption of a system according to which various functions of the computing arrangement, after a selected instruction has been given, are started, performed and terminated partly under the control by the central programming arrangement and partly under the control of individual criteria or events or answers given by the computer which do not influence the programming arrangement.

The invention provides, in combination with an electronically computing electro-mechanically operated accounting machine, a programming arrangement for controlling the sequence of a plurality of accounting machine operations and including control counter means selectably shiftable by application of pulses between a plurality of settings defined by coded address symbols, respectively, and representing different instructions, respectively, for computing, checking and printing operations as the case may be, primary control matrix means responding to a variety of impulses applied thereto and translating such impulses into coded signal pulse combinations corresponding to said coded address symbols, respectively, for setting said control counter means by such pulses accordingly, and distributor control matrix means controlled by said control counter means for transmitting a variety of control signals respectively corresponding to said different settings of said control counter means so as to transmit corresponding instructions for computing, checking and printing operations, impulse generator means for furnishing impulse sequences causing the execution of said computing, checking and printing operations, respectively, and a plurality of control circuit means arranged between said programming arrangement, said impulse generator means and the computing, checking and printing portions of the accounting machine for controlling said computing, checking and printing operations, respectively, depending upon the transmission of said control signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1B:
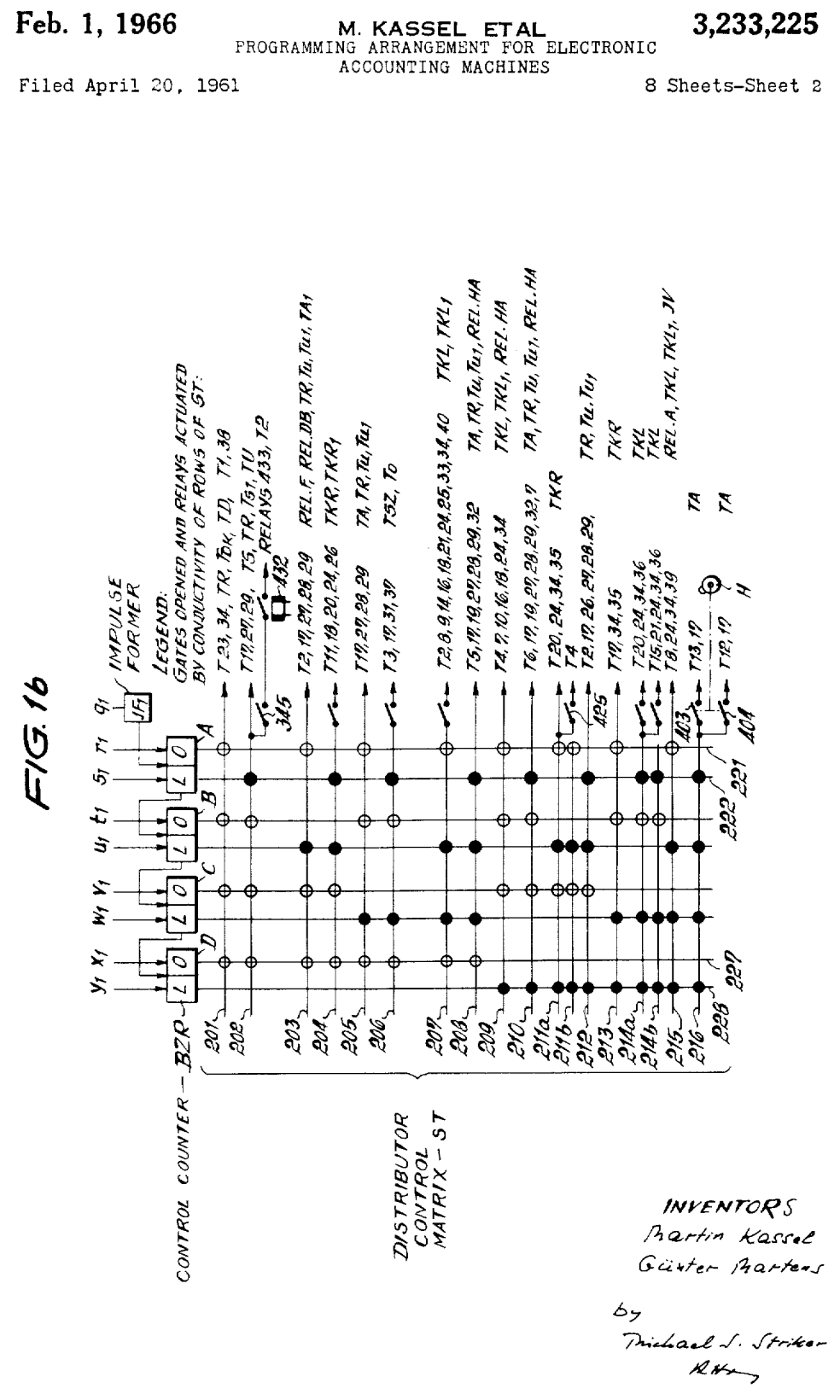

FIG. 1 is a diagram illustrating the relative position of the sheets containing FIGS. 1a, 1b, 1c and 1d for presenting the picture of a complete circuit diagram; connections which extendd from one sheet to another are marked on the respectively adjoining sheets with the same reference numerals; FIGS. 1a–1d together constitute a schematic block diagram illustrating the circuit arrangement of an electronic arrangement according to the invention, it being understood that some obvious connections have been omitted in order not to confuse the drawing, and particularly in FIG. 1b the individual horizontal lines of the matrix ST end in arrows pointing at corresponding legends which are intended to indicate which components in other sheets of the drawings are actuated by signals emanating from these lines of the matrix;

FIG. 2 is a schematic circuit diagram of a shift register having magnetic core register elements;

FIG. 3 is a more detailed fractional representation of a portion of FIG. 1c and 1d;

FIG. 5 is a schematic circuit diagram in block form illustrating an arrangement for transmitting digit values in complementary form from an electronic computing arrangement.

Figure 4C:
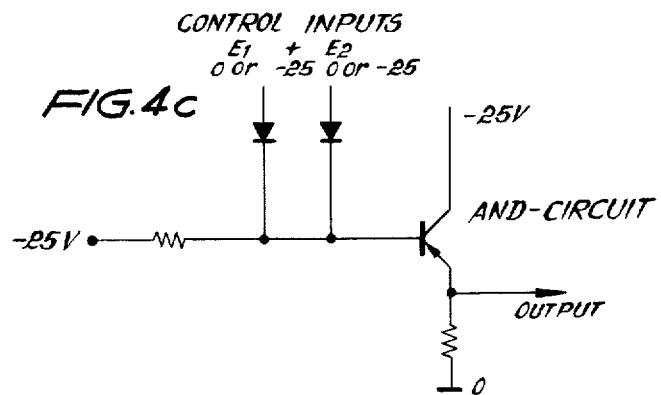
FIGS. 4a, 4b, 4c are detailed diagrams of gate, "OR" and "AND" circuits used in the general arrangement.
Figure 4B:
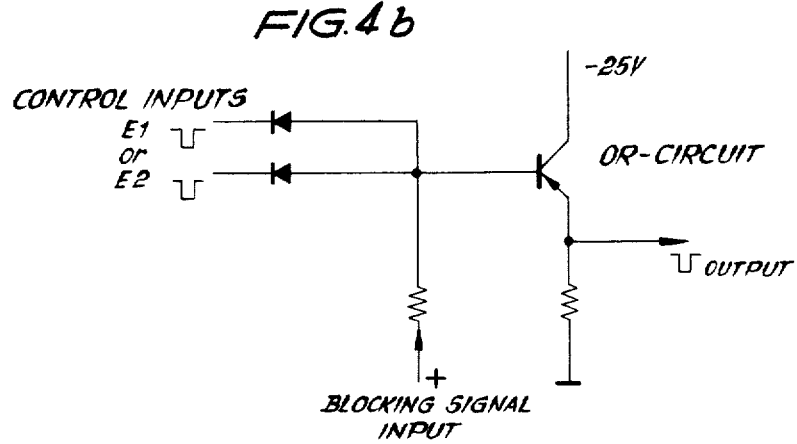
Figure 4A:
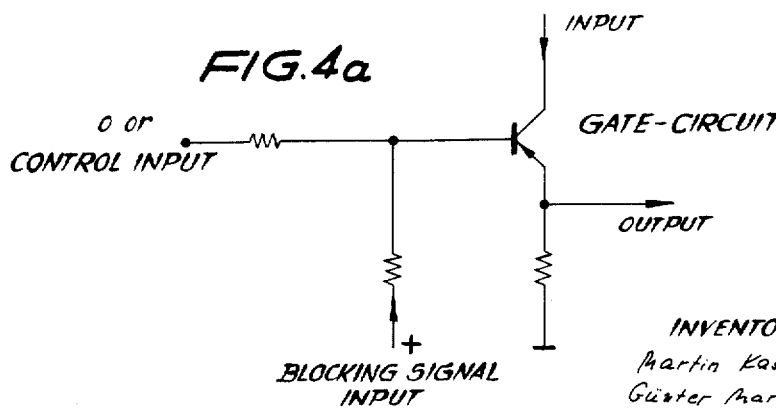

Before entering into a discussion of the details of the illustrated arrangements the following general statements appear to be in order.

In view of the desire to arrive at a most convenient and practical structure of the entire machine, the central programming arrangement is not to be passed by those individual criteria of the computing arrangement which preferably are rendered effective there where instructions and functions are automatically carried out in the computing arrangement and are such that one may blend into or follow the other, particularly where the computing arrangement arrives at decisions e.g. whether a computation result is in numerical value below zero, or whether the last transfer from the transfer storages has been processed, or the like. It is clear that such individual criteria or results or answers of the computing arrangement can be used directly for issuing instructions or for causing another operation without the requirement of actuating or utilizing the central programming arrangement.

On the other hand, certain instructions which are issued by the central programming arrangement through its control counter and distributor control matrix are subjected at the output of the latter first to a check with an individual criterion or result or condition in the computer arrangement so that an instruction coming from the distributor control matrix is either carried out or is modified depending upon decisions previously made by the electronic computing arrangement. An individual criterion of the first type is for instance the decision made by the computing arrangement itself, during a sequence of read-out operations applied to the transfer storages of an accumulator, as to whether a particular read-out transfer is the last one of the series. It is clear that a considerable saving in computing time is obtainable if not all of the transfer storages have to be read out one after the other irrespective of whether any transfer values are stored or not, or, in other words, if the computing arrangement itself is capable of deciding by means of a logical circuit arrangement whether a particular processed transfer was the last one of the particular result. In accordance to conventional systems each individual instruction of this type would have to be made dependent upon an individual decision by the programming arrangement and would release the next following instruction either on a "yes" or on a "no" line of the control circuits in the form of a series or jump instruction.

From the description of an example of an electronically operating accounting machine functioning without a complete programmed input of instructions it will be clear in what manner e.g. a sort of sub-program "processing of transfers" can be executed automatically without a complete predetermined fixed program. The continuous sequence of function proceeds in this case entirely without any return to any instruction addresses. In particular, the continuous decisions "not last transfer" are not communicated to the control counter at all.

Of course it will be necessary occasionally to transmit the report "last transfer" to the control counter in order to cause the release of a next following instruction. In this manner the here described criterion of an abbreviated system of processing transfers differs from the other type of individual criteria mentioned above which will be described further below by referring e.g. to the issue of printed indications of real or complementary digit values from the computer storage (accumulator) of an electronic accounting machine. In this case, which represents an essential feature of the invention, an instruction coming from the programming arrangement is to be modified by an individual criterion appearing in the computer arrangement without such modification or the decision being reported to the programming arrangement, and this is done in such a manner that the received instruction is modified only in the computer arrangement itself and is then applied to the computer, input or output arrangement. In such a case the programming arrangement does not issue instructions like "printing in black directly by transmission from accumulator to printing arrangement" or "printing in red indirectly by transmission by real-to-complement-conversion to printing arrangement" (or vice versa). To the contrary, the instruction is only "printing." At the moment when this instruction is issued by the programming arrangement, there is no record or indication at this point as to whether the numerical value to be printed is larger or smaller than zero, whether this value is stored in the computer storage in real or in complementary form, and whether the value has to be converted or not for the purpose of being printed. All these are decisions which in the conventional method and system must be prepared in the form of fixed programs for the operation of electronic accounting machines and which require in the course of the execution of instructions certain definite return points for reporting existing conditions, according to decisions made to certain specific addresses. It is clear, that such conventional system requires so large and involved program storage capacities that the application of such conventional methods is impossible in the field of comparatively small electronic office machine and electronic automatic accounting machines. But even if a smaller control counter with logical circuits controlled thereby would be provided in a system otherwise characterized by strict programming of instructions and controls by a central electronic programming arrangement, the relation between the components required for the programming arrangement as compared with the requirements of the actual computing arrangement would be quite impractical for the small electronic computing and accounting arrangements in question. This can be recognized easily from the following example: It is quite possible to provide for such a machine which carries out only additions, subtractions in the range above zero and multiplications, with an electronic programming arrangement which deals only with $2^4=16$ internal instructions within a micro-program controlled by the control counter. However, if one would wish to add also subtraction in the range below zero this would already increase the requirement from $2^4$ to $2^5$ instructions. If the capability of the machine should be further increased the number of required instructions would easily increase to $2^6=64$ instructions.

Referring once more to the above-mentioned example of the combination of an instruction "printing" with an individual criterion or decision ("number stored in computer storage is larger or smaller than zero"), it will be seen that according to the invention one stage of the control counter and consequently several hundred logical circuits among the "AND" and "OR" circuits connected therewith and controlled thereby can be saved. The system according to the invention of combining an instruction "printing" with the individual decision "stored number larger than zero" or "stored number smaller than zero," without returning the resulting instructions "print directly" or "print via real-complement-converter" to an instruction address, leads in this case to providing only one single logical circuit which holds in store one or the other of the following answers:

(1) "Computing operation ($\pm$),"
(2) "Change of sign of the stored number and report if necessary" which answers are suitably applied upon the arrival of the instruction "printing."

With reference to the drawings an example of an embodiment of an arrangement according to the invention will be described now. The type of arrangement is characterized by the fact that the control counter is a four-stage counter operating with four binary digits which corresponds to the availability of $2^4=16$ internal instructions, and with the aid of this control counter the electronic accounting machine associated with the circuit arrangement illustrated is capable to handle the three calculation species addition, subtraction (in the ranges above and below zero for indicating a balance), multiplication and the formation of complements, shift of order positions and comparisons (checking on the accuracy and completeness of the result of the individual computing operation).

Since all the mechanical elements of an accounting machine are well-known and do not form part of this invention, the illustration in the accompanying drawings are restricted to the electrical circuits and components of the arrangement in order to illustrate the invention in the most comprehensive manner, and because the clarity of the drawings would be severely hampered by introducing also mechanical elements.

The major components of the arrangement according to the invention as illustrated mainly by FIGS. 1a–1d are the following ones:

(1) A contact matrix KF for storing digital values to be processed, (2) A stepping register ZWS for reading out stored digital values from the contact matrix KF, (3) An electronic computer storage RS, (4) A plurality of computer gates RT arranged between the contact matrix KF and the computer storage RS, the latter being composed of a plurality of individual registers $RS_1$ to $RS_{18}$ respectively assigned to the 1st to the 18th order of decimal numbers, (5) A plurality of transfer storages $U_{sp}$ each one of which is arranged between consecutive registers of the computer storage RS, (6) A transfer processing unit UV, (7) In association with each of the registers of the computer storage RS a group of gates TKR, TKL and TR, respectively, for varying the interconnection of the various registers constituting the computer storage RS, (8) A plurality of gates TD respectively associated and connected to the output and of the various registers of the computer storage RS for controlling the delivery of digital values stored in the just-mentioned registers, (9) A complement-forming unit KB for converting decimal values stored in the computer storage RS into their respective complement values,

(10) A counting chain STK for determining the number of orders of a decimal value stored in the contact matrix KF,

(11) A second counting chain DKZ acting as a control element for the purpose of counting the number of orders in multiplication factors and during the shift of decimal orders of values stored in the computer storage RS,

(12) A programming arrangement composed mainly of a primary control matrix STW, a control counter BZR and a distributor control matrix ST, and

(13) An impulse generator TG composed mainly of a monovibrator in connection with starting and stopping control means and furnishing the operational impulse sequences for the entire arrangement.

The electronic computing arrangement operates asynchronously, i.e., without continuous timing pulses.

The cooperation of the above listed individual main components will be described further below with reference to corresponding examples of their functions. In order to facilitate understanding, first the structure and layout of the programming arrangement will be described by way of example in reference to one possible embodiment thereof. In orderto enable the control counter to control all those functions and operations which are required for carrying out accounting operations in the respective accounting machine, the programming arrangement is equipped with a control counter BZR having four stages of handling 4 binary digits so that a program comprising 16 micro-instructions can be predetermined and carried out. The 16 different instructions are listed below:

| Instruction No. | Code setting of BZR | Function |
|---|---|---|
| 1 | LLOL or LLOL | Shift left "x" order steps in RS same, for replacing any stored value by 0, with subsequent jump to 00LL. |
| 2a | LLLL | Checking whether in KF all contacts are open. |
| 2b | LLLL | Checking whether in KF in each column at least one contact is closed. |
| 3 | 0L00 | Addition. |
| 4 | 0L0L | Counting number of orders of 2nd factor stored in KF. |
| 5 | 0LL0 | Shift left up to stop; counting number of orders of 1st factor; checking on capacity. |
| 6 | 0LLL | Repeated addition. |
| 7 | L000 | Decimal order shift. |
| 8 | L00L | Repeated addition, last digit. |
| 9 | L0L0 | Shift right "x" order steps in RS. |
| 10 | L0LL | Rounding off. |
| 11 | LL00 | Shift right 1 order step. |
| 12 | 0000 | Issue of result; checking on printing capacity. |
| 13a | 000L | Subtraction. |
| 3b | 000L | Checking on printing arrangement. |
| 14 | 00L0 | Addition "9"—Relay F delayed. |
| 15 | 00LL | Shift right "x" order steps in "large ring" and checking on "9." |
| 16 | LLL0 | Shift left in "large ring" dep. on DKZ; activation of relays A and F. |

From the electro-mechanical control bar of the accounting machines starting instructions (macro-instructions) are transmitted in the manner described below through the primary control matrix STW of the programming arrangement so that the setting of the control counter BZR is accordingly effected by so-called jump instructions. Depending upon its actual setting the control counter BZR adjusts, via the distributor control matrix ST, the electronic computing arrangement for the execution of the corresponding function. The control counter BZR is then ordinarily switched forward during the further course of operation so that one function after the other in accordance with the sequence of the above chart is initiated. However, this is not a strict rule, because instructions may be transmitted from the electronic computing arrangement to the control counter BZR via the primary control matrix STW whereby the latter may be shifted to new settings either by jump instructions or by counting impulses.

Before proceeding with an explanation of the operation of the electronic arrangement according to the invention the statement must be made that for the purpose of facilitating the printing of digital values stored in the computer storage RS all the computing operations are carried out with "9's complements." In this case the values stored in the computer storage RS in complementary form can be transmitted, in view of the standard arrangement of the printing types, directly i.e. without conversion to real values, to the printing arrangement. The following is a numerical example:

The 9's complement of 0 is 9.
The 9's complement of 1 is 8.
The 9's complement of 9 is 0.

If we assume for example that in one register of the computer storage RS a "9" is stored, then a shift impulse applied to this register and associated with a positioning step of the type wheel would cause the delivery of an output impulse from the last register element "9" and consequently the energization of the corresponding locking magnet M which in well-known manner prevents a further positional step of the particular type wheel. Consequently, the type wheel has been moved from an ineffective position in which there would be no printing, one step into the position "0" and will now print this value. A further step which would correspond to the storage of a value "8" in the register of the computer storage RS would result in printing the value "1," etc.

The following example of an actual calculation may serve to explain even more clearly the complementary computing system and the corresponding type positioning operation:

| Pulse sequence | | | | | Real value |
|---|---|---|---|---|---|
| | in KF | 0 0 2 3 2 | = | | +232 |
| 0 | in RS | 9 7 2 3 1 | = | | 2768 |
| 1 | RS | 0 8 3 4 2 | | | |
| 2 | RS | 1 9 4 5 3 | | | |
| 3 | RS | 2 0 5 6 4 | | | |
| 4 | RS | 3 1 6 7 5 | | | |
| 5 | RS | 4 2 7 8 6 | | | |
| 6 | RS | 5 3 8 9 7 | | | |
| 7 | RS | 6 4 9 8 | | | |
| 8 | RS | 7 5 | | | |
| 9 | RS | 8 6 | | | |
| | in Usp | 1 1 | | (Transfer from the highest order) | |
| | in RS | 9 6 9 9 9 | = | | 3000 |

| | in KF | 0 0 1 5 6 | = | −156 |
|---|---|---|---|---|
| 0 | in RS | 9 6 9 9 9 | = | 3000 |
| 1 | RS | 9 6 0 0 0 | | |
| 2 | RS | 9 6 0 1 1 | | |
| 3 | RS | 9 6 0 2 2 | | |
| 4 | RS | 9 6 0 3 3 | | |
| 5 | RS | 9 6 0 4 4 | | |
| 6 | RS | 9 6 0 4 5 | | |
| 7 | RS | 9 6 0 4 5 | | |
| 8 | RS | 9 6 0 4 5 | | |
| 9 | RS | 9 6 0 4 5 | | |
| | in Usp | 1 1 1 | | |
| | in RS | 9 7 1 5 5 | = | 2844 |

When now the result 97155 stored in the computer storage RS is to be printed, then ten forward counting impulses are introduced into each of the registers assigned to the various order positons, these impulses being produced by a special impulse generator operatively connected with the type positioning bars so that one impulse is applied to the computer storage RS every time when the type wheel or type bar is moved one positioning step further. As is well-known, every time when the value stored in a register of the computer storage reaches the value 0 the type positioning means are arrested in the corresponding order position so that the type in printing position at this moment will be ready for printing the corresponding value. The following chart will illustrate this well-known procedure.

| Value stored in computer storage RS | Impulse from printing device | Resulting position of printing type |
|---|---|---|
| 9 7 1 5 5 | | |
| 0 8 2 6 6 | 1 | stop 0 0 0 0 0 |
| 1 9 3 7 7 | 2 | 1 1 1 1 |
| 2 0 4 8 8 | 3 | stop 2 2 2 2 |
| 3 1 5 9 9 | 4 | 3 3 3 |
| 4 2 6 0 0 | 5 | 4 4 4 stop |
| 5 3 7 1 1 | 6 | 5 |
| 6 4 8 2 2 | 7 | 6 |
| 7 5 9 3 3 | 8 | 7 |
| 8 6 0 4 4 | 9 | stop 8 |
| 9 7 1 5 5 | 10 | |
| | | 0 2 8 4 4 |

As can be seen the value 0 2 8 4 4 i.e. the real result of the above calculation is now printed.

During the read-out of values stored in the computer storage RS for the purpose of its printing, the plurality of gates TR are in open condition so that a signal delivered from the last register element "9" of each individual register is also returned and applied again to the register element "0" of the same register. No transfers are processed because during this operation the gates Tu leading to the transfer storages Usp remain closed. Consequently, after the delivery of stored values to the printing device the same digital values are stored in all registers of the computer storage RS which were stored therein before this read-out operation.

As far as the start of operations is concerned, it is common practice of anybody operating a calculating office machine that he makes sure, before starting any calculating operation, that the machine is "clear" or on "zero," i.e. that in none of the storage or other components any value is still stored the presence of which would necessarily falsify the intended new calculation. This "clearing" or "setting to zero" does not have to be carried out intentionally by the operator in the case of an arrangement according to the invention because, as will be shown further below, after termination of each bookkeeping or calculating operation the electronic arrangement according to the invention is automatically set to zero and because the arrangement even checks whether all components are definitely returned to zero or normal position. Thus, each subsequent operation of the arrangement can be started without carrying out once more a "clearing" operation or setting all components to "zero" by a manual operation.

Practically, a "clearing" operation of the above type has to be carried out with the arrangement according to the invention only once at the very beginning of its operation, and the instruction "setting to zero" may be given by means of a contact mounted at a lever controlling the return of the mechanical control carriage of the accounting machine to its zero position, so that after the actuation of this lever the mechanical as well as the electronic components of the machine are in their respective "zero" positions. The above-mentioned electrical contact would transmit an impulse via a connection 400 (FIG. 1a) and an impulse former JF to a row 114 of the primary control matrix STW of the programming arrangement.

The electrical connection between the rows and columns of this primary control matrix STW are shown partly by fully black circles and partly by open circles. Each row of this matrix is connected with four of the eight columns 121 to 128 preferably by diodes. The columns 121 to 128 lead to four flip-flops A to D, respectively which constitute the control counter of the programming arrangement.

The columns 121 to 128 of the primary control matrix STW as well as the corresponding columns 221 to 228 (FIG. 1b) are grouped in pairs respectively associated with the above mentioned flip-flops A to D, respectively of the control counter BZR. The even numbered columns 122, 124, 126, 128 and 222, 224, 226 and 228 are intended to place the above-mentioned respective flip-flops into L condition and to derive a corresponding signal therefrom, while the remaining columns serve to place the flip-flops into "0" condition and to derive corresponding signals therefrom. Accordingly, the connections between certain rows and the columns 121, 123, 125 and 127 and 221, 223, 225 and 227, are indicated by open circles, while the connections between certain rows and the columns 122, 124, 126 and 128, and 222, 224, 226 and 228, are shown as fully black circles in order to facilitate recognizing where a code element "L" and where code element "0" is generated or transmitted. The primary control matrix STW comprises two additional columns 119 and 120. Those rows which are shown connected with the column 119 by an open circle serve the double purpose of setting the control counter to a condition corresponding to a code symbol representing a particular instruction (as indicated by the arrangement of black and empty circles in the particular row) and also to transmit from the column 119 a starting impulse through line 344 to the electronic computing arrangement. On the other hand, an impulse transmitted from the electronic computer arrangement or from any other source through column 120 is applied to the control counter BZR via the impulse former JF$_1$ in such a manner that this control counter is switched in a well known manner due to the connections shown in FIG. 1b to the next following desired control condition.

The distributor control matrix ST is connected to the control counter BZR as shown so that, depending upon the coded condition thereof, a group of four of the columns are rendered conductive and, as a consequence, a selected one of the rows 201 to 206 of the matrix ST is likewise rendered conductive provided that the particular row is connected in accordance with the coded instruction chart with the columns which are being rendered conductive. As mentioned above, the rows 201 to 216 extend in the direction to the right, as seen in FIG. 1b and end in arrows pointing at a legend indicating which gates or other circuit components are actuated when the particular rows are rendered conductive. In this manner the electrical computing arrangement is controlled to carry out the desired operation in accordance with coded instructions.

It appears to be advisable to describe details of some important components of the electronic computing arrangement.

As mentioned above, the computer storage RS is composed of a plurality of registers RS$_1$ to RS$_{18}$, each of these registers being assigned to a different decimal order of the numbers to be processed. FIG. 2 illustrates in greater detail the structure of one of these registers. The illustrated register is an electronic shift register comprising ten annular magnet cores. Of course, in the arrangement according to the invention preferably a type of shift register is intended to be used which is preferable to other conventional types of register because of the greatly reduced number of circuit elements required. Each register element of the preferred shift register according to FIG. 2 comprises two parallel circuits, one of which consists of a single winding of a magnet core having a rectangular hysteresis characteristic, the impedance of said winding opposed to current impulses depending upon the magnetization condition of the respective magnet core; the second above mentioned circuit is arranged in parallel to said winding and contains in series-connection a rectifier and a chargeable condenser. A plurality of discharge resistors are so connected with the individual register elements that the discharge current flowing from the respective condenser is applied to the single winding of the magnet core of the next following register element in a direction which is opposite to the direction of the shift impulses.

The above described circuit arrangement of the register elements makes it possible to use only one single winding on the magnet cores having a rectangular hysteresis characteristic. Magnet cores with this characteristic differ significantly from conventional "soft" magnet cores. In view of the fact that the coercive force of this type of core is sufficiently constant, a change of magnetization continues until a definite condition of saturation is reached. On account of the rectangular form of the hysteresis characteristic even a considerable increase of the magnetizing field cannot result in a further increase of the magnetic flux. Consequently, a magnet core having a rectangular hysteresis characteristic tends to flip between two limit values of magnetization depending upon in which direction the magnetizing field acts. Thus, the wound magnet core of this characteristic does not behave like a pure inductance. Certainly voltages are induced in the magnet windings during the change of magnetization, however, when the flow of current is interrupted, no self-induced voltage peaks are produced as is the case with inductance devices comprising "soft" magnet cores, because the previously produced flux condition remains unchanged.

Therefore, magnet cores with rectangular hysteresis characteristic carrying a winding display the significant feature of responding to a current pulse of given polarity flowing through the winding by either developing a counter voltage or not, depending upon the magnetization condition of the core at the time when the pulse arrives.

The development of a counter voltage depends upon a change of flux within the magnet core. A substantial change of flux, however, can develop in a magnet core having a substantially rectangular hysteresis characteristic only if the magnet core is not already in a saturated condition corresponding to the direction of the applied energization. The development of a counter voltage results in a voltage drop in the winding of the magnet core and this voltage drop can be defined by an equivalent resistance which in the following description will be called magnetization change resistance.

A magnet core of the above described type together with its winding constitutes therefore a dipole which, upon application of a current impulse, is capable of displaying two alternative resistivities. These two alternative conditions of resistivity which depend upon the preceding magnetization condition of the magnet core, may be associated with alternative bits of information, e.g. "yes" and "no," or "one" or "zero," or "1" or 0. In the circuit arrangement according to FIG. 2 the distribution of current between the winding on the magnet core and the parallel charging circuit of a condenser can be controlled by the magnetization change resistance in such a manner that the production of a condenser charge depends upon the information stored in the respective core. In the other hand, by the discharge of the condenser through the winding of the next following similar magnet core the information can be transferred from the first core to the second core. The circuit arrangement is such that the current flowing by discharge of the condenser to the discharge circuit passes through the winding of the next following magnet core in a direction which is opposite to that of a shift impulse.

If a plurality of such identical register elements is arranged as a chain, then it is possible to shift yes-no-informations in steps by current pulses introduced by stepping of shift impulses.

Referring again to FIG. 2, each element of the 5-element chain illustrated by way of example comprises a magnet core 510, 511, . . . 519, respectively, having a rectangular hysteresis characteristic and having an appropriately mounted winding 520, 521, . . . 529, respectively, a chargeable condenser 530, 531, . . . 539, respectively, in series with a charging rectifier 540, 541, . . . 549, respectively, and a discharge resistance 550, 551, . . . 559, respectively, these resistances being connected between consecutive register elements.

In operation, negative shift impulses 561 are introduced at the input 560 whereby the step-wise shift of information stored in the register is to be effected.

It may be assumed that the magnet core 510 has stored therein, in accordance with the polarity of its magnetization, the information "1" while the remaining cores are in opposite condition corresponding to the storage of information "0." The cores with storage "0" and cores with the storage "1" differ from each other only by their response to a shift impulse. While the cores in condition corresponding to "0" do not react in any manner to a shift impulse, the cores containing information "1" respond by a change of the flux therein, or in other words by developing a magnetization change resistance.

Returning to the above example, with information "1" stored in the core 510 this means that upon the introduction of a shift impulse 561 only in the winding 520 of the core 510 a voltage drop will appear while in the windings of the remaining cores no such drop will appear. However, due to the voltage drop across the winding 520 necessarily charging of the condenser 530 via the rectifier 540 is effected.

In the course of this charging procedure a division of current flow between the winding 520 and the circuit of the chargeable condenser 530 take place and the current portions flowing through the windings 520 causes the core 510 to change its magnetization so that it flips into a condition which corresponds to the information "0."

The simultaneously starting discharge of the condenser 530 across the resistance 550 causes a transfer current to flow through the winding 521 of the magnet core 511, but this current flows through the winding 521 in a direction which is opposite to that of the previously applied shift impulse. This reverse current flowing through the winding 521 causes a change of magnetization of the core 511 which corresponds to a transfer of the information "1" from the core 510 to the core 511. The core 511 is now changed from an information storing condition "0" to a condition "1."

It should be noted that the direction of the currents passing through the magnet chain or register do not have to coincide with the direction of shift of information because by reversing the polarity of the diodes the entire register could be operated with positive shift impulses instead of with negative shift impulses without changing the effect. There is no fixed relation between the direction of the shift impulses and the direction of the shift of information.

It is to be borne in mind that the shift of information can only take place after the termination of the corresponding shift impulse because during the duration of this impulse all the magnet cores are blocked and prevented from transferring information. Therefore, the discharge of the condensers, e.g. of the condenser 530 is to be given such a duration that after the termination of the shift impulse the then still available charge is sufficient for changing or reversing the magnetization of the next following core 511.

On the other hand, since, as mentioned above, all the register elements or magnets are blocked during the duration of the shift impulses, it is advisable to keep the duration of the shift impulses as brief as possible. The minimum duration of these impulses is the time required for changing the magnetization of a magnet core from one saturated condition to its opposite saturated condition.

A further shift of information from the magnet core 511 to the core 512 etc. is carried out in an analogous manner. With every shift impulse and information "1" stored in any one of the cores is shifted one step to the next following element, i.e. $n$ shift impulses shift the information $n$ steps or through $n$ elements. In this manner it is also possible to shift simultaneously a group of consecutively stored individual informations as a group, the position of the individual informations within the group remaining unchanged.

It is to be stressed again that in this arrangement the shifting of informations requires only one single winding on every core. However, whenever this should appear desirable, for instance for the purpose of introducing signals or deriving signals at some point of the register, additional windings may be mounted on the respective cores which windings however would not take part in the actual shifting operation. By means of such additional windings it is possible either to introduce serially through the winding of a single magnet core, or simultaneously in parallel through a plurality of windings on different cores, signals or signal combinations into the register for being stored therein. The time of introducing such additional signals must be located between different shift impulses.

FIG. 3 illustrates certain details of the stepping register or read-out chain ZWS and of the contact matrix KF. In view of the special tasks to be performed by the chain ZWS in connection with a decimal electronic computer arrangement, the chain ZWS comprises ten cores 0-9. For the sake of clarity of the diagram all the windings required for the shifting operation and all other elements concerned therewith are not shown in FIG. 3, particularly in view of the fact that these details are generally known.

At the beginning of operations, the core 0 of the chain ZWS is in a condition of magnetic remanence which corresponds to the storage of the information "1," while all the other nine cores 1 to 9 are in their opposite or idle condition "0." As stated above, the cores carrying the information "0" and the cores carrying the information "1" differ from each other only by their response to shift impulses. While those cores which are in idle condition "0" do not respond to shift impulses, those cores which carry information "1" respond by a change of the flux therein or, in other words, by developing a magnetization change resistance. In accordance with the above described example the first shift impulse caused the core 0 to be returned to its idle condition while automatically causing the following core 1 to assume the condition "1." The next following second shift impulse would shift the information from the core 1 to the core 2, and so on. Since the chain or register ZWS is provided with a ring connection (see FIG. 1c) the tenth impulse would return the core 9 to its idle condition "0" and would transmit the information "1" to the core 0, with the result that now the chain ZWS is again in its original condition. Since each core of the chain requires for the purpose of shifting information only one winding each, sufficient room is left on each core for applying several output windings. These are shown in FIG. 3. Accordingly each core is equipped with three output windings $W_1$, $W_2$ and $W_3$. All the output windings $W_1$ are connected at one of their ends (the so-called cold ends) with a common line 562, and similarly all the windings $W_2$ are connected with a common line 563, and all the windings $W_3$ are connected with a common winding 564. The opposite ends of the output windings $W_1$, $W_2$ and $W_3$ are taken to a network 565. This network 565 serves to distribute the output impulses from the chain ZWS, in accordance with the peculiar internal connection arrangement of this network, via impulse amplifiers J, respectively, to the rows or lines 320 to 329 of the contact matrix KF. A plurality of diodes 566 is provided between the individual windings $W_1$, $W_2$, $W_3$ of the cores 0 to 9 and the network 565 and are so polarized that they permit only the passage of impulse currents from said windings which are generated inductively whenever the respective core is changed in its magnetic condition between a condition "1" and the condition "0." Additional control elements serve to permit selection of delivery of impulses to the network 565 from either one of the three groups of windings $W_1$, $W_2$ and $W_3$, respectively. Consequently, the groups of windings $W_1$, $W_2$ and $W_3$ may be selected to be connected into the arrangement for carrying out different operations depending upon the particular program. The connection and disconnection of one or the other of said groups of windings is carried out in the illustrated example by means of electronic switching arrangements 567 and 568.

The chain ZWS is in the illustrated example actually a control means and is designed to carry out the following five functions:

(1) The real value digit input into the electronic computer storage RS through the contact matrix KF.

(2) Complement value digit input into the electronic computer storage RS through the contact matrix KF.

(3) Production of nine counting impulses.

(4) Decimal order shift by ten counting impulses.

(5) Zero input into the computer storage RS having no values stored therein, after decimal order shift.

(6) Automatic termination of shift after passage of the shifting operation through the whole register.

However, the above list of functions is not a limiting one but constitutes only a selection out of a great number of further possibilities of carrying out other or additional functions or controls.

The output windings $W_1$ of the cores 0 to 8 connected to the common line 562 are connected at their opposite ends within the network 565 with a common line 569 through which nine counting impulses can be transmitted via a delay unit VZ6 and via line 310a to the electronic computer storage RS. The impulse delivered from the output winding $W_1$ of the core 9 via a line 570 establishes the fact that a complete shift of information through the chain ZWS has been accomplished and causes via line 302 (FIG. 1c) the termination of an operation in the accounting machine or the start of a following new operation.

The following is now a description of the operation of the entire arrangement with reference to the various instructions listed in the chart further above.

INSTRUCTION NO. 1
Control Counter Setting L L 0 L
"Clearing the Computer Storage RS" or
"Shift Left 'X' Decimal Orders"

The above mentioned first starting or clearing impulse from line 409 or a mechanically caused impulse through line 100 into the row 114 of the primary control matrix STW causes the control counter BZR to assume the condition LL0L and is also transmitted via column 119 to the input 344 (FIG. 1a) and from there through a delay unit $VZ_1$ (FIG. 1c) and line 311a to the start input of the impulse generator TG. At the same time this starting impulse has pre-actuated the element 1 of the decimal order counting chain DKZ by storing information in this element 1 via element VW and the open gate $T_{21}$ of the gate group $AV_1$. The chain DKZ controls order shifts in the computer storage RS and causes such decimal order shifts to repeat until an impulse emanating from the last or highest element 18 of DKZ prevents any further shifts as will be described below. Depending upon which element of the decimal order counting chain DKZ is selected for being pre-actuated any number of 1 to 18 decimal order shifts can be initiated. In the present case the instruction from 114 caused pre-actuation of the element 1 of the chain DKZ so that 18 decimal order shifts will take place in the computer storage RS. This is necessary at the beginning of the entire operational cycle because the computer storage RS is composed of 18 registers $RS_1$ to $RS_{18}$ and because it is intended that all these registers are to be cleared or set to "0."

The impulse sequence from the generator TG is taken to the shift generator VG(ZWS) and from there through a connection, not shown in FIG. 1c, to the stepping register or counting chain ZWS which has the task of reading out any digital values stored in the contact matrix KF and to cause the transfer thereof into the computer storage RS.

In the present case no digital value is yet stored in the contact matrix KF so that all the contacts thereof provided for connecting rows and columns of this matrix are in open position. This contact matrix is composed of ten rows 320 to 329 and of as many columns as there are computing registers in the computing storage RS. For the sake of simplicity in FIG. 1c only columns 330, 331 and 332 are shown. Actually, in the present case there are 11 computing registers in the computer storage RS and therefore there are actually 11 columns in the contact matrix KF. In a manner well known in the art, the rows and columns of the contact matrix are connectable by electromechanical contacts, not shown, located at the respective intersection points, which contacts are put into closed position provided that a numerical value is introduced into the contact matrix KF. At the present instant, as mentioned above, none of the contacts of the contact matrix KF are to be in closed position. The first impulse from the generator TG arriving at the chain ZWS shifts the information from its element 0 into its element 1. The read-out pulse emitted accordingly from the element 0 is taken via the row 320 and the connected line 401 to a delay unit $VZ_7$ (FIG. 1d) and from there through a gate $T_{36}$ to the element 0 of the lowest order register $RS_1$ of the computer storage RS. It is to be noted that the gate $T_{36}$ is open at this time because conductivity of the row 114 of the matrix STW has also caused conductivity of the row 214a of the matrix ST, and the arrow at the righthand end of the row 214a points at the legend "$T_{36}$" which means that through the conductvity of the row 214a this gate has been opened. The delay unit $VZ_7$ is so constructed that the impulse introducing information into the element 0 of the register $RS_1$ arrives there after the first impulse issued by the generator TG, but before the second impulse is issued by this generator.

The impulse sequence from the generator TG goes not only to the chain ZWS, but also via a gate $T_{34}$ (also opened by row 214a) and via line 424' (FIGS. 1c and 1d) to the shift generators $VG_1$ to $VG_{18}$ respectively associated with all the eighteen registers of the computer storage RS. Each of the impulses of said sequence shifts the stored information in all the registers one step forward. For the sake of simplicity again a connection between the just-mentioned shift generators $VG_1$ to $VG_{18}$ and the respectively associated registers $RS_1$ to $RS_{18}$ are not shown in FIG. 1d but in FIG. 3. Since after the first shift impulse derived from generator TG the value "0" has been stored in the first register $RS_1$, this stored information will arrive, after the application of ten impulses from generator TG, at the element "9" of the first register $RS_1$. The value storage "9" corresponds as has been explained above, as a complement to a real value digit storage "0." As can be seen from the legend in FIG. 1b at the right hand end of the row 214a of the distributor control matrix ST, the plurality or groups of gates TKL has been opened so that the individual registers of RS are connected in a series-arrangement and that after ten impulses from the generator TG the entire stored information in the registers of the computer storage RS has been shifted one decimal order position to the left, i.e., in the direction toward the highest decimal order. It is now sure that in the register $RS_1$ assigned to the first and lowest order position only the digital value "0" can be present, which means in complementary representation "9." Any value that previously was stored, i.e., before this decimal order shift, in the register $RS_{18}$ of the storage RS has been removed therefrom and has been destroyed because the gate $TKL_1$ is in closed condition. After the second decimal order shift by means of further ten shift impulses it is sure that the two registers $RS_1$ and $RS_2$ are set to "0," and after the eighteenth decimal order shifts all the registers $RS_1$ to $RS_{18}$ are surely and reliably set to "0" and thus cleared. Every tenth impulse from generator TG issuing from the element 9 of the chain ZWS is returned to the element 0 of this chain, as can be seen in FIG. 1c. However this pulse travels simultaneously also via a gate $T_{24}$ (opened by row 214) to the shift generator VG(DKZ) of the decimal order counting chain DKZ and switches this chain one step forward. Consequently, after eighteen such steps in the counting chain DKZ, i.e., after eighteen decimal order shifts in the computer storage RS, the element 18 of the chain DKZ issues an output impulse which goes via line 402 to the stop input of the generator TG so as to stop the latter. In a well known manner the generator TG comprises a multivibrator MV controlled by a flip-flop having an opening portion $F_o$ and a closing portion $F_c$.

After the completion of the above described operation the electronic computing arrangement of the machine is "cleared," i.e., set to "0" and is ready for a new computing operation.

In order to carry out a computation it is necessary to introduce a first numerical value into the machine, i.e., a first operand which in the subsequently following computation may serve either as a minuend, as addend or as a multiplication factor. This numerical value may either enter the machine automatically, e.g., by "automatic balance transfer," or it is manually introduced by the operator by means of the keyboard. Since the machine in question is a bookkeeping or accounting machine the particular numerical value is to be printed on a voucher or the like. Thus this value is mechanically introduced into the group of adjusting and control members by means of the pin carriage and in this manner transmitted to the printing types which are positioned during an operational cycle of the respective drive motor whereafter the printing operation is carried out. During the positioning of the mechanical elements of the machine the electronic arrangement automatically checks whether in the contact matrix KF all the contacts thereof are in open position. This is necessary because if one of these contacts would have been left in closed position after a previous computation, such closed contact would falsify the now following storage of a number information in the contact matrix KF. Therefore, after the above mentioned check and after completion of the setting of the mechanical elements of the machine, e.g., during the printing operation, the first numerical value (first operand) which is to be printed is now stored by setting the contacts in the contact matrix KF. Now it has to be checked again automatically whether in every column (respectively assigned to the different order positions of the respective number) of the matrix KF one contact is in closed position. This is also necessary because in case of an incompletely or not closed contact in any one of the columns of the matrix KF a proper processing of the mechanically adjusted or set numerical value must be prevented. At the beginning of the operational cycle of the motor drive a contact operated by a cam on the main shaft H of the mechanical counting machine arrangement an impulse through input 100 and a following impulse former $JF_2$ and gate $T_{46}$ is introduced into the row 116 whereby the control counted BZR is changed to a setting LLLL.

INSTRUCTION NO. 2a

Control Counter Setting L L L L
"Check Whether Contact Matrix KF Is Open"

Now the main shaft H of the accounting machine additionally closes by cam operation a contact 403 (FIG. 1b). The row 216 of the distributor control matrix ST is now conductive and transmits, through the control counter BZR and row 116 of the matrix STW and its column 119 an impulse via the input 344 and line 311a (FIG. 1c)

to the start input of the impulse generator TG. The same impulse opens via line 311b a group of gates $RT_1$, $RT_2$, $RT_3$, etc. by means of the respectively pertaining flip-flops 312. The generator TG transmits a pulse sequence through the shift generator VG(ZWS) to the counting chain ZWS so that the latter will read-out consecutively the ten rows 320 to 329 of the contact matrix KF in order to find out whether and where a contact at any intersection of columns and rows is in closed position. Should any one of the contacts have been left in closed condition then a read-out impulse applied to the respective row will be transmitted into the corresponding column 330 etc. and switch the respective flip-flop 312 to its opposite condition in which it closes the pertaining or associated gate RT. At the same time, such impulse which closes one of the gates RT travels via a common line 405 which is connected with all the columns of the matrix KF to a gate $T_{13}$ (FIG. 1a), and thus into the row 103 of the primary control matrix STW. Accordingly, through the columns 121, 124, 125 and 127 the control counter BZR is changed to a setting 00L0 whereby the row 203 of the matrix ST is rendered conductive. Since row 103 is not connected with the columns 119 no instruction is issued through this column. However, the conductivity of the row 203 causes actuation of an error relay F (FIG. 1d) as is indicated by the legend at the righthand end of the row 203. The relay F is so constructed that it reacts fully only after a certain delay and by its reaction stops any further operation by disconnecting the drive motor and causes a visible signal to appear which indicates to the operator that the machine is not operating properly.

If however the just described check has resulted in finding that no contact was in closed condition in the contact matrix KF so that this has been found in satisfactory operative condition, then the generator TG is stopped after the passage of ten impulses to the chain ZWS by the last output pulse through line 302 via gate $T_{17}$ which is open according to the legend at the righthand end of row 203. Herewith the above mentioned "check whether contact matrix is open" is terminated. In the meantime the adjusting and printing operation of the mechanical section of the accounting machine has proceeded. The cam operated contact 403 is again open while in the meantime by a similar cam operation the contact 404 has been closed. Simultaneously, after the completion of the above mentioned check, the continuing motor operation has caused by mechanical means the numerical value (which is to be printed) to be introduced and stored in the contact matrix KF by closing of the corresponding contacts in the various rows and columns thereof. If this introduction of a numerical value into the contact matrix KF is carried out properly then in each of its eleven columns one contact must be in closed position because otherwise the numerical value would not be properly represented by closed contacts in the matrix.

INSTRUCTION NO. 2b

Control Counter Setting Remains LLLL
"Check Whether A Contact In Each Column Is Closed"

During the further rotation of the main shaft H of the mechanical section of the accounting machine another impulse is applied, through another cam-operated contact closing, via input 100, impulse former $JF_2$ and the now open gate $T_{46}$ into the row 116 of the primary control matrix STW. As mentioned above, the contact 494 (FIG. 1b) has been closed already. The repeated activation of the row 116 does not result in any change of the setting of the control counter BZR or of the matrix ST, but is required only for starting the electronic arrangement again via column 119. This starting impulse travels via input 344 and line 311a to the start input of the generator TG and causes the latter to start its operation. In addition, as in the previous case, all the computer gates $RT_1$, $RT_2$, $RT_3$, etc. are opened via line 311b and by acting on the respective flip-flops 312.

Again the counting chain ZWS reads-out the rows 320 to 329 of the contact matrix KF in consecutive order. As the read-out impulses from ZWS scan the rows 320 to 329 such impulses are transmitted via any contact found closed at any intersection between the rows and the respective columns through such columns to the respectively associated flip-flops 312 so that the latter are changed to their second or "off" condition whereby the respectively associated computer gates RT are closed. After ten read-out impulses have passed through the chain the impulse issuing from the last element 9 of the chain ZWS is transmitted via line 302 and gate $T_{17}$ to the stop input of the generator TG whereby the latter is stopped.

For the purpose of checking whether in each of the eleven columns of the contact matrix KF one contact was closed, a checking gate PT (FIG. 1c) is provided. From all of the flip-flops 312, and more particularly from their lower sections $F_o$ which open the associated computer gates, a common line 406 is taken to the control input of the checking gate PT which is so constructed that it is kept in open or conductive condition as long as at least one or several of the flip-flops 312 are in said condition in which their lower section $F_o$ is activated. As explained above, each flip-flop 312 is changed or switched by an impulse arriving from the respective column 330 etc. from said lower "open" condition to the upper "off" condition so that the line 406 will not carry any current when in each of the eleven columns of the matrix KF one contact is in closed condition. The tenth impulse issuing from the element 9 of the chain ZWS, which impulse stops the impulse generator TG, is simultaneously transmitted to the main input of the checking gate PT and cannot pass therethrough unless the contact matrix KF has been found to be in proper operative condition. If only in one column of the matrix KF no contact was closed, the pertaining flip-flop 312 remains in its lower "open" condition so that the line 406 remains supplied with current and keeps the checking gate PT open with the result that the tenth impulse from ZWS will pass through the checking gate PT and proceed to a gate $T_{12}$ (FIG. 1a) and will enter from there the row 103 of the primary control matrix STW. The activation of this row 103 results, as explained above, in rendering the row 203 of the control matrix ST conductive whereby the error relay F is actuated as indicated by the legend at the righthand end of row 203. When this error relay F has reacted it will, as already described above, switch off the drive motor and will cause an indication by visual means to the operator that the machine is not in proper operating condition.

It is to be understood that if in both above described checks according to instructions No. 2a and No. 2b the contact matrix KF has been found in proper operative condition, then the printing operation is completed up to its end and then a tabulation movement of the carriage is initiated. The carriage moves into a position corresponding to a column "addition" and through a cam operated contact another impulse is applied to input 100 which now travels via $T_{43}$ now open, to the row 105 of the primary control matrix STW. Hereby the control counter is changed to a setting of 0L00.

INSTRUCTION No. 3

Control Counter Setting 0 L 0 0

"Addition"

In this setting each of the registers $RS_1$ to $RS_{18}$ of the computer storage RS are individually connected as a ring because the row 205 is also conductive and consequently the gates TR are open according to the legend at the righthand end of row 205. For the same reason all the gates $Tu$ are in open position so that the transfers from the individual registers can be stored in the respective transfer storages $Usp$ and processed. From the control bar of the carriage and through a cam-operated contact an impulse was transmitted to the input 100 and via the impulse former $JF_2$ and a gate $T_{43}$, now open, into a row 105 of the primary control matrix STW. The impulse applied to the row 105 travels via column 119 to the input 344 of the electronic computing arrangement and starts via line 311a the impulse carrier TG. Via line 311b all the computer gates $RT_1$, $RT_2$, etc. of the first eleven computing registers of the computer storage RS are opened. The generator TG transmits an impulse sequence for operating in the above described manner the chain ZWS. From the chain ZWS the impulses number 1 to 9 of the generator TG are transmitted by the output of element 8 of the chain via a delay unit $VZ_6$ to the shift generator $VG_{12}$ to $VG_{17}$ of the registers $RS_{12}$ to $RS_{17}$, respectively, and also, with delay, via $T_{29}$ to the shift generators $VG_1$ to $VG_{11}$ of the registers $RS_1$ to $RS_{11}$, respectively FIG. 3. If a particular read-out impulse from one element of the chain ZWS meets a closed contact representing a digit value in the contact matrix KF, then this impulse is transmitted without delay to the respective computer gate RT so as to close the latter. The shift impulse which then arrives with a predetermined delay via line 310a finds that particular gate RT closed and can therefore not pass to the respective register of the computer storage RS. However, if the shift impulse does not find a gate closed then it will pass therethrough and cause a one-step shift in the respective register. After ten impulses from the generator TG an impulse leaves the element 9 of the chain ZWS and stops via line 302 the generator TG. In addition this impulse initiates, by passing through gate $T_{27}$, now open according to FIG. 1b the activation of the transfer processing unit UV which is connected with all the transfer storage units Usp.

The transfer processing unit UV is of known type (see U.S. Pat. No. 2,706,597) and is so constructed that it carries out automatically only so many read-out operations of the transfer storage Usp as are necessary, which means that the read-out operation is automatically terminated as soon as in none of the transfer storages Usp is any value stored. It can be seen that this system entails great savings in time in the case of continuous multiple computations because it may be that in a partial computation a value is stored in only one or two of the transfer storages Usp so that already after one or two read-out operations the entire transfer processing operation can be terminated and the next partial computation can be started. The transfer processing unit UV emits read-out impulses to the transfer storages Usp which have the effect that information storage in such a storage is canceled and thereby the shift generator associated therewith and assigned to the register RS of the next higher order position is actuated so that this particular register is then shifted by the action of that shift generator one step forward equalling the value "1". In other words, each transfer storage Usp carrying stored information transmits, upon arriving at a read-out impulse, this stored information to the corresponding register of the computer storage RS. At the same time the particular transfer storage transmits also an impulse via line 313 to the transfer processing unit UV and causes the latter to start another read-out operation. As soon as no value is stored anymore in any one of the transfer storages Usp no such signal via line 313 to the unit UV is transmitted. Thus this unit will not be started again, and delivers instead from another output thereof via line 314 and column 119 an impulse to the start input of the generator TG whereby the latter, for instance in the case of a multiple operation (multiplication), is started again whereby the next following partial operation is automatically initiated.

In the above described example no real addition was taken into consideration but only the input of the first factor of a multiplication explained further below. During the read-out impulses caused by the generator TG the contact matrix KF was read-out and the numerical value stored therein by the closing of a selection of contacts has been transmitted in complementary value representation to the registered $RS_1$ to $RS_{11}$ of the computer storage RS. After the termination of this input or storage of the first factor into the computer storage RS the next following setting of the programing arrangement is carried out under control of the carriage depending upon another tabulation movement thereof.

An example in figures may be illustrated for explaining the just described operation:

| Impulse No. | | |
|---|---|---|
| 0 | in KF | 0 0 0 0 0 0 0 2 8 4 4 |
|   | in RS | 9 9 9 9 9 9 0 9 9 9 9 9 9 9 9 9 9 |
| 10 | in RS | 9 9 9 9 9 9 9 9 9 9 9 9 9 7 1 5 5 |

INSTRUCTION NO. 4

Control Counter Setting 0 L 0 L

"Counting the Number of Decimal Orders of the Second Factor"

By closing a contact under the action of a cam on the control bar of the paper carriage an impulse is applied to the input 100 and transmitted via a gate $T_{44}$, now open, to the row 106 of the primary control matrix STW. Hereby the control counter BZR is changed to a setting 0L0L and renders consequently also the row 206 of the distributor control matrix ST conductive. At the same time said impulse travels from row 106 through column 119 to the input 344 of the electronic computing arrangement and starts via line 311a the impulse generator TG. At said moment this first factor is already stored in complementary form in the computer storage RS, with its lowest order digit in the register $RS_1$. In the meantime the second factor has been introduced and stored in the contact matrix KF, either by manual operation of a keyboard or by read-out of a different storage, and is now ready to be printed also. However, the release of this second factor to being printed depends on a check as to whether the seventeen computing registers of the computer storage RS are able to accommodate the respective product of the two factors, which check is carried out by counting the number of decimal orders of both factors. If by the check explained below the capacity of the computer storage RS has been found sufficient then the second factor is released for being printed and the multiplication program is initiated. If however, it is found that the capacity of the computer storage RS is not sufficient, then this printing operation is prevented and any further continuation of the program is stopped.

The number of decimal orders of the second factor stored in the contact matrix KF is counted by means of the contact matrix and the decimal order counting chain STK (FIG.1c), and this count is carried out and expressed in terms of a complement to the number of units of the decimal order counting chain STK i.e. to the valve "13." For this purepse the starting impulse from line 311a is branched off through the connection shown in the drawing so as to store information in the first element 1 of the thirteen elements of the chain STK and at the same time the fifth generator VG(STK) is triggered via a delay unit $VZ_5$. By the resulting first shift impulse the first element 1 is read out and delivers an output signal. The output windings of the various elements of the chain STK are connected through the zero contacts of the contact matrix KF and a gate $T_0$, opened by conductivity of row 206, to zero potential, and more specifically the output from the element 1 from the chain STK is connected via the zero contact of the eleventh i.e. highest order column of the contact matrix KF, the element 2 is connected in the same manner with the tenth column and so on until the element 11 of the chain STK is connected via the first column 330 of the contact matrix KF.

For the sake of clarity in the FIG. 1c only the connections of the three lowest order columns 330, 331 and 332 are illustrated. The line 407 connects the lowest column 330 with the element 11 of the chain STK, the line 408 connects column 331 with the element 10 and the line 409 connects the column 332 with the element 9. The output lines from the various elements of the decimal order counting chain STK, designated by reference numerals 417, 418, 419 . . . 427 are taken via the delay unit $VZ_5$ to the shift generator VG(STK). In the common line 410 a gate TSZ is provided which has been opened by the conductivity of the row 206 of the matrix ST. The output signal from the element 1 of the chain STK is therefore made possible by the closed condition of the zero contact in the eleventh order column of the contact matrix KF and triggers via line 427, gate TSZ, line 410 and delay unit $VZ_5$ the shift generator VG(STK) which thereupon shifts the information stored in the element 1 into the element 2 of the chain STK. Thus the counting chain STK will be shifted as many steps as there are zeros in the highest order positions of a number stored in a contact matrix KF. This cycle is repeated until the first time in one of the checked orders no zero is found in the contact matrix KF. The value stored now in the decimal order counting chain STK is consequently equal to the value $13-m$ wherein $m$ represents the number of decimal orders of the second factor stored in KF.

During this operation of counting the zeros in the contact matrix KF the counting chain ZWS is kept operating by the control generator TG and stops after a sequence of ten impulses the generator TG via gate $T_{17}$. At the same time the tenth inpulse from the chain ZWS travels via gate $T_3$ (FIG. 1a) to the column 120 of the primary control matrix STW. Hereby, through the impulse former $JF_1$ the control counter BZR is shifted to its next following position or setting defined by the code symbol 0LL0.

INSTRUCTION NO. 5

Control Counter Setting 0 L L 0

"Shift Left of the First Factor in the Computer Storage RS and Counting the Number of Decimal Order Shifts"

The first factor which up to this moment has been stored in the lowest order registers of the computer storage RS is now shifted under the above instruction, in which the row 207 of the matrix ST is conductive, in direction toward left i.e. towards higher orders by repeated order shifts until this first factor is so stored that the digit in its highest order is stored in the register $RS_{18}$ of the computer storage RS. For carrying out this operation the computer storage RS is connected as "chain and large ring," which means that the gates TKL are open (due to 207) to transfer information from one register to the next following one, and that the gate $TKL_1$ (also opened by 207) transfers the information leaving the element 9 of $RS_{18}$ to the element 0 of the now empty register $RS_1$. The element 2 of the decimal order counting chain DKZ is to be pre-activated at the beginning of this operation. The last impulse from the chain ZWS which naturally indicates the end of each decimal order shift operation, causes also the counting chains STK and DKZ to shift every time one step, this being accomplished through the gates $T_{24}$ and $T_{25}$ transmitting the pulse to the respective shift generators. Moreover, the above mentioned tenth impulse from the chain ZWS travels via line 302, gate $T_{18}$ (opened by 207) to a checking unit $PR_2$ (FIG. 1d), reaching the latter at its main input so as to coincide in this unit with the output signal "9" from element 8 of the register $RS_{18}$ which is applied via line 342 to the blocking input of the device $PR_2$.

As long as during the decimal order shift from the last element 9 of the register $RS_{17}$ a real value "0" in the form of the complementary value "9" is transmitted to the element "0" of the register $RS_{18}$, and the tenth impulse from the element 9 of the chain ZWS arrives at the checking unit $PR_2$ via line 302 and gate $T_{18}$ simultaneously with the output pulse from the element 8 of the register $RS_{18}$ of the register $RS_{18}$ via line 342, no output signal is issued from the checking unit $PR_2$ via the output line 343. However, as soon as the highest order digit of the first factor, necessarily differing from the above mentioned value "9," is transmitted into the register $RS_{18}$, then the above mentioned coincidence of pulses arriving at the checking unit $PR_2$ does not exist anymore because one impulse is prior to the other one so that now an output signal is delivered from the unit $PR_2$ via line 343 and gate $T_{16}$, open through row 207, to the stop input of the generator TG and prevents the continuation of further decimal order shifts.

The above mentioned output signal from the checking unit $PR_2$ is simultaneously delivered via lines 343 and 421', a gate $T_{33}$, opened by row 207, and a delay unit $VZ_3$ (FIG. 1c) to a transfer storage UL$sp$ which is associated with the decimal order counting chain STK. At the same time this output impulse is also transmitted via a line 422' to a delay unit $VZ_4$ (FIG. 1c). As mentioned above, before carrying out a multiplication operation it is necessary to examine or to check whether the capacity of the computer storage RS is sufficient for carrying out a multiplication of the two introduced multi-order factors. The condition for a positive answer to this question is that $(13-m)+(18-n)$ is at least equal to 14. Herein "$m$" is the number of decimal orders of the second factor which is at this moment still stored in the contact matrix KF, while "$n$" is the number of decimal orders of the first factor which, by means of the just executed decimal order shift according to instruction No 5 has been shifted into the registers of the highest orders of the computer storage RS. If the condition according to the above given equation is met, then a transfer is effected, due to the decimal order shift of the first factor, into the transfer storage UL$sp$ of the accounting chain STK as described above. However, if the above condition is not met i.e. the capacity of the computer storage RS appears to be exceeded, then no such transfer takes place. Consequently, when thereafter the storage UL$sp$ is read out no output signal will be transmitted therefrom to the control counter STW. In this case the output signal from the checking unit $PR_2$ is only effective through the delay unit $VZ_4$ and activates via the gate $T_9$ (FIG. 1a), open through row 207, the row 115 of the control matrix STW. The control counter BZR is correspondingly changed and thereby the row 215 is rendered conductive which corresponds to the instruction LLL0 and consequently the electronic computing arrangement receives the instruction "shift left of information stored in RS in great ring connection." This decimal order shift is controlled by the decimal order counting chain DKZ. The execution of this instruction will be explained in detail further below, but at this instance it is to be mentioned that in execution of this instruction the entire first factor is now shifted again from the highest order registers of the computer storage RS into the lowest order registers of this storage. When this shift of the first factor is completed a control signal will be given via gate $T_8$ into row 103a of the primary control matrix STW as will be explained further below. This will result in an instruction 00L0 which has been mentioned further above. Since the row 103a is not connected with the control column 119, and since in the above described manner the row 203 is automatically rendered conductive, after a short delay the error relay F is activated, as indicated by the legend at the right hand end of row 203, so that a visible signal indicates to the operator that the multiplication cannot be carried out with the two introduced factors.

Another difficulty may consist in the fact that the first factor is equal to 0. This could be due to a malfunction of the arrangement which prevented the transmission of numerical values from the contact matrix KF into the computer storage RS. However it is also possible that the operator simply forgot to introduce the first factor. In this case in the course of the previously described left shifts an output signal from the element 8 of the register $RS_{18}$ will appear when information is shifted from this element 8 to the following element 9 and will be transmitted via line 342 to the "AND" unit 411 where it coincides with the last output impulse from the decimal counting chain DKZ arriving via line 402 so that a signal without any delay is transmitted from the unit 411 through gate $T_8$, opened by row 207, and from there into row 103a of the first control matrix STW. Also in this case the row 203 is rendered conductive so as to activate the error relay F whereby an indication is given to the operator that an irregularity exists because a multiplication with the factor 0 would have to be carried out.

It appears to be justified to provide for activation of the error relay F in this case because it is very rare that multiplications with a factor "0" are to be carried out. It is much more likely that such a condition has arisen unintentionally.

Should, however, the condition be such that in fact a multiplication with "0" is to be carried out which may be the case when inventories are taken (example: 0 pieces×$3.60 per piece=$00.00), then by the operation of a suitable key or switch the error signal is extinguished, the paper carriage is tabulated so that it shifts into the column position "product." By moving in this position the carriage causes automatically a signal to be delivered via input 100 and gate $T_{41}$ into row 101 of the primary control matrix STW whereby the control counter BZR is set for instruction 0000 corresponding to instruction No. 12 "printing" and row 201 is rendered conductive in order to make it possible to have this instruction executed. The operation according to this instruction will be explained in detail further below. The electronic arrangement according to the invention further checks automatically whether the first subsequent multiplication is a one-order number or a multi-order number. If this factor is a one-order number, then the final output impulse from the decimal order counting chain DKZ travels via line 402 to a delay unit $VZ_3$ and from there to a gate $T_{14}$, opened by row 207, which permits the passage of this impulse to the row 110 of the primary control matrix STW whereby the control counter BZR is changed to condition L00L and renders the row 210 of the distributor control matrix ST conductive. At the same time from row 110 through column 119 an operation according to instruction No. 8 "repeated addition of the last digit" is initiated. The execution of this operation will be described further below.

In most ordinary cases the first factor will be a two-order or multi-order number. In this case, the read-out impulse emanating from the chain ZWS and line 302 through checking unit $PR_2$ is delivered via line 343 and line 421′ so as to read out the storage $ULsp$ whereupon the latter issues an output signal via line 423′ which travels via delay unit $VZ_2$ and a gate $T_2$, opened by line 207, to the column 120 of the first control matrix STW. As explained above, an impulse through this column and through the impulse former $JF_1$ switches the control counter BZR into its next following condition which corresponds to the instruction 0LLL.

INSTRUCTION NO. 6

Control Counter Position 0 L L L

"Repeated Addition"

This instruction "repeated addition" is transmitted by the same impulse passing through gate $T_2$ via column 119. This impulse starts via line 311a the impulse generator TG and furthermore opens via line 311b the computer gates RT associated with the registers $RS_1$ to $RS_{11}$, respectively, of the computer storage RS. By the impulses issued from the generator TG the chain ZWS is step-wise shifted. The individual shift impulses in the chain ZWS are transmitted through its lateral outputs via a delay unit $VZ_6$ and the gate $T_{29}$ to the computer gates RT and moreover via gate $T_{28}$, opened also by row 208, to the shift generators $VG_{12}$ to $VG_{17}$ to the registers $RS_{12}$ to $RS_{17}$, respectively, of the computer storage RS. The final output impulse from the chain ZWS after one complete shift stops via line 302 and gate $T_{17}$ the generator TG while simultaneously activating via gate $T_{27}$, opened by row 208, the transfer processing unit UV.

The final output from the transfer processing unit UV via line 314 travels via gate $T_{19}$, opened by row 208, to the shift generator $VG_{18}$ of the register $RS_{18}$ and also to the main input of the checking unit $PR_2$. If there is no coincidence between this impulse arriving at the main input of the unit $PR_2$ with an output signal emanating from the element 8 of the register $RS_{18}$ arriving at the blocking input of $PR_2$, then the impulse from the chain ZWS is capable of passing through the checking unit $PR_2$ and travels via line 343 and gate $T_{32}$, opened by row 208, and from there through line 311a to the generator TG so as to start the latter for carrying out a further addition operation, while at the same time via line 311b the computer gates RT are again opened. Consequently, repeated addition with the interpolation of transfer processing operations are carried out until an impulse emanating from element 8 of the register $RS_{18}$ arriving via line 342 at the blocking input of the unit $PR_2$ indicates that the register $RS_{18}$ has been shifted or counted up to the point where it contains the information "0" (complementarily "9"). The output signal from the element 8 of the register $RS_{18}$ indicating this condition travels however at the same time via line 342 to a gate $T_5$ (opened by row 208), and from there again into the column 129 of the primary control matrix STW so that again the control counter BZR is switched one step further into a setting L000. The corresponding operation is at the same time started by the impulse traveling through gate $T_5$ via column 119 of the first matrix STW.

INSTRUCTION NO. 7

Control Counter Setting L 0 0 0

"Decimal Order Shift"

After the transfer of the second factor stored in the contact matrix KF into the computer storage RS (in accordance with that digit value which was originally stored in the register $RS_{18}$) the control counter BZR has been switched, as mentioned above to the setting L000. This means that the row 209 is conductive so that according to the legend at the right-hand end of this row the gates TKL and the gate $TKL_1$ are all opened. Consequently the computer storage RS is now switched in such a manner that the individual registers $RS_1$ to $RS_{18}$ are connected as a serial chain, and that the entire chain is switched through the gate $TKL_1$ to the condition "great ring connection."

The shift impulses from generator TG are transmitted via gate $T_{34}$, opened by row 209, and line 424′ in parallel into all the shift generators $VG_1$ to $VG_{18}$ of the eighteen registers, respectively, of the computer storage RS. A transfer signal from the element 9 of each individual register $RS_1$ to $RS_{17}$ is transmitted by the pertaining gate TKL to the elements 0 of the respectively next following higher-order register. However, the transfer signal from the element 9 of the register $RS_{18}$ travels via gate $TKL_1$ to the element 0 of the register $RS_1$. The final output impulse of the chain ZWS, i.e. the tenth impulse from generator TG, indicates the end of a decimal order shift and at the same time shifts the decimal order counting chain DKZ one step forward as described above. In addition this same impulse travels via line 302 and gate $T_{18}$, opened by row 209, to the checking unit $PR_2$ which now checks whether in the register $RS_{18}$ the complementary value "9" corresponding to the real value "0" is stored. If after a decimal order shift a value "9" is introduced into the register $RS_{18}$, then this means that the first factor contains in the particular order the digit "0." In this case the checking unit $PR_2$ does not issue an output signal because the impulse arriving at its blocking input is in time coincidence with the arrival of the input at its main input, and therefore a further decimal order shift takes place without any interruption and without the control counter BZR or the distributor control matrix ST being newly adjusted or set or read out.

Depending upon the remaining number of orders and depending upon the digital value in the particular order position of the first factor the following program steps are possible:

(1) The remainder of the first factor comprises digits in at least two more order positions: In this case the output signal from the register $RS_{18}$ is not in time coincidence with the final impulse from the chain ZWS. This last output impulse travels via line 302 and gate $T_{18}$ and through the checking unit $PR_2$ and further through line 343 and gate $T_{16}$ to the generator TG so as to stop the latter, while it simultaneously travels to the delay unit $VZ_4$. This unit furnishes a signal via $T_{10}$, opened by row 209, into the row 108 of the first control matrix STW and thereby causes a return to the setting No. 6 symbolized 0LLL by setting the control counter BZR accordingly and rendering row 208 of the matrix ST conductive while simultaneously issuing a starting impulse for the next partial computation via column 119 connected with row 108.

(2) The remainder of the first factor is only one single digit: In this case the output signal from the element 18 of the decimal order counting chain DKZ indicates that it is the last or highest-order digit of the first factor which is to be processed. This signal steps via line 402 the generator TG and travels at the same time via delay unit $VZ_3$ and gate $T_4$, opened by row 209, into column 120 of the first control matrix STW and consequently switches via the impulse former $JF_1$ the control counter BZR into its next following setting No. 8 identified by the symbol L00L. At the same time the performance of an operation according to this instruction is caused by the signal via $T_{14}$ and column 119 and input 344 in the manner described above. The performance of this operation will be described further below in detail. The signal which has also arrived at the delay unit $VZ_4$ cannot have any effect any more because in the meantime the gate $T_{10}$ is not open any more since it is not among the gate switches which are activated by conductive condition of the row 210 of the matrix ST.

(3) The remainder of the first factor is only one digit and this digit is "0." In this case the output signal from the decimal order counting chain DKZ via line 402 coincides in the "AND" circuit 411 with the output signal "9" from the register $RS_{18}$ arriving via line 342 and is therefore transmitted without delay to an order cancellation control AV.

The following operations for cancelling digits in the lowest order positions are possible:

Cancel no digit (no orders): In this case a signal is transmitted via the order cancellation arrangement AV from the "AND" circuit 411 via gate $T_7$, opened by row 210, and from there through gate $T_{61}$ into row 113a. Consequently, the control counter BZR is cranged to setting LL00 whereby the row 213 of the distributor control matrix ST is rendered conductive. However, since the row 113a is not connected with the colum 119, no signal is transmitted through this column so that the multiplication program is in this case terminated at this point.

Cancelling one digit in the lowest order position: The signal from the "AND"-circuit 411 travels via the order cancellation arrangement AV, in the manner described above, and more specifically through gate $T_{60}$ thereof, into the row 112 of the primary control matrix STW whereby the control counter is changed to the setting L0LL. Hereby the row 212 of the distributor control matrix ST is rendered conductive while at the same time the instruction No. 10 "rounding off" is given via column 119. A more detailed explanation of the execution of this instruction will be given further below.

Cancellation of digits in two or more order positions: In this case the signal from the "AND-circuit 411 travels in the manner described through the order cancellation arrangement AV and more specifically through gate $T_{50}$ and changes through column 120 and impulse former $JF_1$ the control counter BZR to its next following setting L0L0 according to instruction No. 9. Hereby the rows 111 and 211 are rendered conductive and the instruction "decimal shift right $x$ order positions in chain connection" is given via column 119 of the primary control matrix STW. Also the execution of this operation will be described further below.

In the case of the present example the remainder of the first factor has still more than two order positions, and therefore the distributor control matrix ST is set again, by means of a pulse through the delay unit $VZ_4$ and row 108 so as to issue again the instruction No. 6 "repeated addition."

Hereafter the settings for instruction No. 6 and for instruction No. 7 will follow each other in repeated alternation until a situation is reached in which the remainder of the first factor is only one digit in one single order position. As explained above, in this case no return from instruction No. 7 to instruction No. 6 takes place via the primary control matrix STW and the control counter BZR, but the control counter BZR is changed from the setting for instruction No. 7 to the next following setting corresponding to instruction No. 8 identified by the code symbol L00L.

INSTRUCTION NO. 8

Control Counter Setting L00L

"Repeated Addition, Last Digit"

This instruction No. 8 differs from the instruction No. 6 only by the termination procedure thereof. While in the case of instruction No. 6 the output signal "9" from element 8 of the register $RS_{18}$ has been used for switching the control counter BZR to another setting No. 7 represented by the symbol L000, in the case of instruction No. 8 said signal from the register $RS_{18}$ travels through a gate $T_6$, opened by row 210 which was rendered conductive by the setting L00L, to the input of the order cancellation arrangement AV and initiates the corresponding order cancellation procedure.

Again several order cancellation procedures are possible.

Cancelling no digit in lowest order position: The output signal from the register $RS_{18}$ travels via gate $T_6$ through gate $T_{61}$ and from there to the primary control matrix STW and reaches row 113a whereby the control counter BZR is changed to setting LL00 whereby a jump to instruction No. 11 is carried out without issuing a control signal through column 119. The multiplication procedure is terminated herewith.

Cancelling one digit in the lowest order position: The output signal from the register $RS_{18}$ travels via gate $T_6$ to gate $T_{60}$ and from there to the primary control matrix STW and enters line 112 whereby the control counter BZR is switched to jump to the setting L0LL representing instruction No. 10 while at the same time the column 119 transmits an instruction for carrying out the instruction "rounding off."

Cancelling digits in two or more of the lowest order positions: The output signal from the register $RS_{18}$ travels in the same manner as described above to the gate $T_{59}$ and from there into column 120 of the primary control matrix STW and causes switching of the control counter BZR one step further into the setting L0L0 corresponding to instruction No. 9 "decimal order shift right $x$ order positions" while at the same time an instruction signal is given from row 111 via column 119 for carrying out this instruction.

With further reference to the above stated numerical example, starting with the instruction number 3, the execution of the instructions Nos. 4–8 for carrying out a multiplication of the factors $$2\ 8\ 4\ 4 \quad \times \quad 1\ 2\ 3\ 4\ 5\ 6\ 7\ 8\ 9$$

is illustrated step by step in numerical form further below.

It is to be born in mind that the first factor of this computation, namely the number 2844 has been introduced into the computer storage RS in execution of instruction No. 3.

| Shift Impulse No. | | Instruction No. 4 Setting 0L0L | |
|---|---|---|---|
| | in KF | 0 0 1 2 3 4 5 6 7 8 9 | 2nd factor |
| | in STK | 0 0 0 1 0 0 0 0 0 0 0 0 | |
| | | Instruction No. 5 Setting 0LL0 | |
| 0 | in DKZ | 0 0 0 0 0 0 0 0 0 0 0 0 0 0 1 0 | |
| | in STK | 0 0 0 1 0 0 0 0 0 0 0 0 | |
| | in RS | 9 9 9 9 9 9 9 9 9 9 9 9 9 7 1 5 5 | 1st factor |
| 1 | RS | 0 0 0 0 0 0 0 0 0 0 0 0 8 2 6 60 | (from RS$_{18}$) |
| 2 | RS | 1 1 1 1 1 1 1 1 1 1 1 1 9 3 7 71 | |
| 3 | RS | 2 2 2 2 2 2 2 2 2 2 2 2 0 4 8 82 | |
| 4 | RS | 3 3 3 3 3 3 3 3 3 3 3 3 1 5 9 93 | |
| 5 | RS | 4 4 4 4 4 4 4 4 4 4 4 2 60 0 4 | |
| 6 | RS | 5 5 5 5 5 5 5 5 5 5 5 3 71 1 5 | |
| 7 | RS | 6 6 6 6 6 6 6 6 6 6 6 4 82 2 6 | |
| 8 | RS | 7 7 7 7 7 7 7 7 7 7 7 5 93 3 7 | |
| 9 | RS | 8 8 8 8 8 8 8 8 8 8 8 6 0 4 4 8 | |
| 10 | RS | 9 9 9 9 9 9 9 9 9 9 9 7 1 5 5 9 | |
| | in DKZ | 0 0 0 0 0 0 0 0 0 0 0 0 0 1 0 0 | |
| | in STK | 0 0 0 0 1 0 0 0 0 0 0 0 | |
| 20 | in RS | 9 9 9 9 9 9 9 9 9 9 9 7 1 5 5 9 9 | |
| | in DKZ | 0 0 0 0 0 0 0 0 0 0 0 0 1 0 0 0 | |
| | in STK | 0 0 0 0 0 1 0 0 0 0 0 0 | |
| 30 | in RS | 9 9 9 9 9 9 9 9 9 9 7 1 5 5 9 9 9 | |
| | in DKZ | 0 0 0 0 0 0 0 0 0 0 0 1 0 0 0 0 | |
| | in STK | 0 0 0 0 0 0 1 0 0 0 0 0 | |
| 40 | in RS | 9 9 9 9 9 9 9 9 9 9 7 1 5 5 9 9 9 | |
| | in DKZ | 0 0 0 0 0 0 0 0 0 0 1 0 0 0 0 0 | |
| | in STK | 0 0 0 0 0 0 0 1 0 0 0 0 | |
| 50 | in RS | 9 9 9 9 9 9 9 9 9 7 1 5 5 9 9 9 9 | |
| | in DKZ | 0 0 0 0 0 0 0 0 0 1 0 0 0 0 0 0 | |
| | in STK | 0 0 0 0 0 0 0 0 1 0 0 0 | |
| 60 | in RS | 9 9 9 9 9 9 9 9 7 1 5 5 9 9 9 9 9 | |
| | in DKZ | 0 0 0 0 0 0 0 0 1 0 0 0 0 0 0 0 | |
| | in STK | 0 0 0 0 0 0 0 0 0 1 0 0 | |
| 70 | in RS | 9 9 9 9 9 9 9 7 1 5 5 9 9 9 9 9 9 | |
| | in DKZ | 0 0 0 0 0 0 0 1 0 0 0 0 0 0 0 0 | |
| | in STK | 0 0 0 0 0 0 0 0 0 0 1 0 0 | |
| 80 | in RS | 9 9 9 9 9 9 7 1 5 5 9 9 9 9 9 9 9 | |
| | in DKZ | 0 0 0 0 0 0 1 0 0 0 0 0 0 0 0 0 | |
| | in STK | 0 0 0 0 0 0 0 0 0 0 0 1 0 | |
| 90 | in RS | 9 9 9 9 9 7 1 5 5 9 9 9 9 9 9 9 9 | |
| | in DKZ | 0 0 0 0 0 0 1 0 0 0 0 0 0 0 0 0 | |
| | in STK | 0 0 0 0 0 0 0 0 0 0 0 0 1 | |
| 100 | in RS | 9 9 9 9 7 1 5 5 9 9 9 9 9 9 9 9 9 | |
| | in DKZ | 0 0 0 0 0 1 0 0 0 0 0 0 0 0 0 0 | |
| | in STK | 0 0 0 0 0 0 0 0 0 0 0 0 | "UL$sp$" |

| Shift Impulse No. | | Instruction No. 5 Setting 0L0L | | | | | | | | | | | | | | | | | | |
|---|---|---|---|---|---|---|---|---|---|---|---|---|---|---|---|---|---|---|---|---|
| 110 | in RS | 9 | 9 | 9 | 7 | 1 | 5 | 5 | 9 | 9 | 9 | 9 | 9 | 9 | 9 | 9 | 9 | 9 | 9 | |
| | in DKZ | 0 | 0 | 0 | 0 | 0 | 1 | 0 | 0 | 0 | 0 | 0 | 0 | 0 | 0 | 0 | 0 | 0 | 0 | |
| | in STK | - | - | - | - | - | - | - | - | - | - | - | - | - | - | - | - | - | - | |
| 120 | in RS | 9 | 9 | 7 | 1 | 5 | 5 | 9 | 9 | 9 | 9 | 9 | 9 | 9 | 9 | 9 | 9 | 9 | 9 | |
| | in DKZ | 0 | 0 | 0 | 0 | 1 | 0 | 0 | 0 | 0 | 0 | 0 | 0 | 0 | 0 | 0 | 0 | 0 | 0 | |
| 130 | in RS | 9 | 7 | 1 | 5 | 5 | 9 | 9 | 9 | 9 | 9 | 9 | 9 | 9 | 9 | 9 | 9 | 9 | 9 | |
| | in DKZ | 0 | 0 | 0 | 1 | 0 | 0 | 0 | 0 | 0 | 0 | 0 | 0 | 0 | 0 | 0 | 0 | 0 | 0 | |
| 140 | in RS | 7 | 1 | 5 | 5 | 9 | 9 | 9 | 9 | 9 | 9 | 9 | 9 | 9 | 9 | 9 | 9 | 9 | 9 | |
| | in DKZ | 0 | 0 | 1 | 0 | 0 | 0 | 0 | 0 | 0 | 0 | 0 | 0 | 0 | 0 | 0 | 0 | 0 | 0 | |
| | | Instruction No. 6 Setting 0LLL | | | | | | | | | | | | | | | | | | |
| | in KF | | | | | 0 | 0 | 1 | 2 | 3 | 4 | 5 | 6 | 7 | 8 | 9 | | | | 2nd Factor |
| 0 | in RS | 7 | 1 | 5 | 5 | 9 | 9 | 9 | 9 | 9 | 9 | 9 | 9 | 9 | 9 | 9 | 9 | 9 | 9 | |
| 1 | RS | 7 | 2 | 6 | 6 | 0 | 0 | 0 | 0 | 0 | 0 | 0 | 0 | 0 | 0 | 0 | 0 | | | |
| 2 | RS | 7 | 3 | 7 | 7 | 1 | 1 | 1 | 1 | 1 | 1 | 1 | 1 | 1 | 1 | 1 | | | | |
| 3 | RS | 7 | 4 | 8 | 8 | 2 | 2 | 2 | 2 | 2 | 2 | 2 | 2 | 2 | 2 | | | | | |
| 4 | RS | 7 | 5 | 9 | 9 | 3 | 3 | 3 | 3 | 3 | 3 | 3 | 3 | 3 | | | | | | |
| 5 | RS | 7 | 6 | 0 | 0 | 4 | 4 | 4 | 4 | 4 | 4 | 4 | 4 | | | | | | | |
| 6 | RS | 7 | 7 | 1 | 1 | 5 | 5 | 5 | 5 | 5 | 5 | 5 | | | | | | | | |
| 7 | RS | 7 | 8 | 2 | 2 | 6 | 6 | 6 | 6 | 6 | 6 | | | | | | | | | |
| 8 | RS | 7 | 9 | 3 | 3 | 7 | 7 | 7 | 7 | 7 | | | | | | | | | | |
| 9 | RS | 7 | 0 | 4 | 4 | 8 | 8 | 8 | 8 | | | | | | | | | | | |
| | in Usp | | $\overset{+}{1}$ | 1 | 1 | 1 | 1 | 1 | 1 | 1 | 1 | 1 | 1 | 1 | 1 | 1 | | | | |
| | | | $\overset{=}{1}$ | 5 | 5 | 9 | 9 | 9 | 9 | 9 | 8 | 7 | 6 | 5 | 4 | 3 | 2 | 1 | 0 | UV |
| | in RS | 8 | 1 | 5 | 5 | 9 | 9 | 9 | 9 | 9 | 8 | 7 | 6 | 5 | 4 | 3 | 2 | 1 | 0 | = |
| 11 | RS | 8 | 2 | 6 | 6 | 0 | 0 | 0 | 0 | 0 | 9 | 8 | 7 | 6 | 5 | 4 | 3 | 2 | | |
| 12 | RS | 8 | 3 | 7 | 7 | 1 | 1 | 1 | 1 | 1 | 0 | 9 | 8 | 7 | 6 | 5 | 4 | | | |
| 13 | RS | 8 | 4 | 8 | 8 | 2 | 2 | 2 | 2 | 2 | 1 | 0 | 9 | 8 | 7 | 6 | | | | |
| 14 | RS | 8 | 5 | 9 | 9 | 3 | 3 | 3 | 3 | 3 | 2 | 1 | 0 | 9 | 8 | | | | | |
| 15 | RS | 8 | 6 | 0 | 0 | 4 | 4 | 4 | 4 | 4 | 3 | 2 | 1 | 0 | | | | | | |
| 16 | RS | 8 | 7 | 1 | 1 | 5 | 5 | 5 | 5 | 5 | 4 | 3 | 2 | | | | | | | |
| 17 | RS | 8 | 8 | 2 | 2 | 6 | 6 | 6 | 6 | 6 | 5 | 4 | | | | | | | | |
| 18 | RS | 8 | 9 | 3 | 3 | 7 | 7 | 7 | 7 | 7 | 6 | | | | | | | | | |
| 19 | RS | 8 | 0 | 4 | 4 | 8 | 8 | 8 | 8 | 8 | | | | | | | | | | |
| | in Usp | | $\overset{+}{1}$ | 1 | 1 | 1 | 1 | 1 | 1 | 1 | 1 | 1 | 1 | | | | | | | |
| | | | $\overset{=}{1}$ | 5 | 5 | 9 | 9 | 9 | 9 | 9 | 7 | 5 | 3 | 0 | 8 | 6 | 4 | 2 | | UV |
| | in RS | 9 | 1 | 5 | 5 | 9 | 9 | 9 | 9 | 9 | 7 | 5 | 3 | 0 | 8 | 6 | 4 | 2 | | = |
| | | Instruction No. 7 Setting L000 | | | | | | | | | | | | | | | | | | |
| | in DKZ | 0 | 0 | 1 | 0 | 0 | 0 | 0 | 0 | 0 | 0 | 0 | 0 | 0 | 0 | 0 | 0 | 0 | | |
| 0 | in RS | 9 | 1 | 5 | 5 | 9 | 9 | 9 | 9 | 9 | 7 | 5 | 3 | 0 | 8 | 6 | 4 | 2 | 1 | |
| 10 | in RS | 1 | 5 | 5 | 9 | 9 | 9 | 9 | 9 | 7 | 5 | 3 | 0 | 8 | 6 | 4 | 2 | 1 | 9 | |
| | in DKZ | 0 | 1 | 0 | 0 | 0 | 0 | 0 | 0 | 0 | 0 | 0 | 0 | 0 | 0 | 0 | 0 | 0 | | |
| | | Instruction No. 6 Setting 0LLL | | | | | | | | | | | | | | | | | | |
| | in KF | | | | | 0 | 0 | 1 | 2 | 3 | 4 | 5 | 6 | 7 | 8 | 9 | | | | (UV omitted |
| 0 | in RS | 1 | 5 | 5 | 9 | 9 | 9 | 9 | 9 | 7 | 5 | 3 | 0 | 8 | 6 | 4 | 2 | 1 | 9 | + |
| 9 | RS | 2 | 5 | 5 | 9 | 9 | 9 | 9 | 9 | 7 | 4 | 0 | 7 | 4 | 0 | 7 | 4 | 3 | 0 | = |
| 19 | RS | 3 | 5 | 5 | 9 | 9 | 9 | 9 | 9 | 7 | 2 | 8 | 3 | 9 | 5 | 0 | 6 | 4 | 1 | +<br>= |
| 29 | RS | 4 | 5 | 5 | 9 | 9 | 9 | 9 | 9 | 7 | 1 | 6 | 0 | 4 | 9 | 3 | 9 | 5 | 2 | +<br>= |
| 39 | RS | 5 | 5 | 5 | 9 | 9 | 9 | 9 | 9 | 7 | 0 | 3 | 7 | 0 | 3 | 7 | 0 | 6 | 3 | +<br>=<br>+ |

| Shift Impulse No. | | Instruction No. 5 Setting 0L0L |
|---|---|---|
| 49 | RS | 6 5 5 9 9 9 9 9 6 9 1 3 5 8 0 2 7 4 = |
| 59 | RS | 7 5 5 9 9 9 9 9 6 7 9 0 1 2 3 4 8 5 =+ |
| 69 | RS | 8 5 5 9 9 9 9 9 6 6 6 6 6 6 6 6 9 5 =+ |
| 79 | RS | 9 5 5 9 9 9 9 9 6 5 4 3 2 0 9 9 0 7 =+ |
| | | Instruction No. 7 Settng L000 |
| 0 | in DKZ | 0 1 0 0 0 0 0 0 0 0 0 0 0 0 0 0 0 0 |
| | in RS | 9 5 5 9 9 9 9 9 6 5 4 3 2 0 9 9 0 7 |
| 10 | in DKZ | 1 0 0 0 0 0 0 0 0 0 0 0 0 0 0 0 0 0 |
| | in RS | 5 5 9 9 9 9 9 6 5 4 3 2 0 9 9 0 7 9 |
| | | Instruction No. 6 Setting 0LLL |
| | in KF | 0 0 1 2 3 4 5 6 7 8 9 + |
| 0 | in RS | 5 5 9 9 9 9 9 6 5 4 3 2 0 9 9 0 7 9 = |
| 9 | RS | 6 5 9 9 9 9 9 6 5 3 0 8 6 4 2 2 9 0 =+ |
| 19 | RS | 7 5 9 9 9 9 9 6 5 1 8 5 1 8 5 5 0 1 =+ |
| 29 | RS | 8 5 9 9 9 9 9 6 5 0 6 1 7 2 8 7 1 2 =+ |
| 39 | RS | 9 5 9 9 9 9 9 6 4 9 3 8 2 7 1 9 2 3 =+ |
| | | Instruction No. 7 Setting L000 |
| 0 | in DKZ | 1 0 0 0 0 0 0 0 0 0 0 0 0 0 0 0 0 0 |
| | in RS | 9 5 9 9 9 9 9 6 4 9 3 8 2 7 1 9 2 3 |
| 10 | in DKZ | 0 0 0 0 0 0 0 0 0 0 0 0 0 0 0 0 0 0 |
| | in RS | 5 9 9 9 9 9 6 4 9 3 8 2 7 1 9 2 3 9 |
| | | Instruction No. 8 Setting L00L |
| | in KF | 0 0 1 2 3 4 5 6 7 8 9 + |
| 0 | in RS | 5 9 9 9 9 9 6 4 9 3 8 2 7 1 9 2 3 9 =+ |
| 9 | RS | 6 9 9 9 9 9 6 4 2 9 5 9 2 6 2 4 5 0 =+ |
| 19 | RS | 7 9 9 9 9 9 6 4 9 1 3 5 8 0 5 6 3 1 =+ |
| 29 | RS | 8 9 9 9 9 9 6 4 9 0 1 2 3 4 8 8 7 2 =+ |
| 39 | RS | 9 9 9 9 9 9 6 4 8 8 8 8 9 2 0 8 3 =+ |
| | | Product in complementary form without cancellation of lowest orders |
| | in DKZ | 0 0 0 0 0 0 0 0 0 0 0 0 0 0 0 0 0 0 |

INSTRUCTION NO. 9

Control Counter Setting L 0 L 0

"Decimal Order Shift Right of the Number Stored in Computer Storage RS, $x$ Order Positions, in Chain Connection"

As can be seen from the above numerical example of the operation according to instruction No. 8, the multiplication product finally is stored in complementary form with digits in twelve order positions in the computer storage RS. With the new instruction No. 9 the sub-program "cancelling low order positions" is initiated. The first step according to instruction No. 9 causes the product to be shifted "$a-1$" order positions in the direction towards right i.e. in the direction to the lowest order registers of the computer storage RS. In this term "$a$" is the number of the order positions that are to be cancelled on account of an order given from the control bar of the paper carriage. In the subsequent operation according to instruction No. 10 the product is "rounded off" by adding the value "5" in the register $RS_1$ of the computer storage RS and by the subsequent transfer processing.

In the further following operation according to instruction No. 11 the rounded product is shifted one step according to the remaining unused order position in direction towards right so that the product is then stored in correct order position in the computer storage RS and is ready for being printed.

The number of order positions which are to be cancelled is predetermined under control by the paper carriage and corresponds to the macro-program controlled and determined by the control bar of the machine. The cancellation of low order positions can, however, also be predetermined by actuation of the keyboard for instance in the case of percent or per mil calculations or the like. The number "$x$" of decimal order shifts in direction to the right is determined by the number "$a$" of order positions to be cancelled because "$x$"=$a-1$.

The decimal order counting chain DKZ is preset for "$x$" order positions either from the paper carriage or manually by introducing a corresponding information into the respective element of the chain, and after each decimal order shift this stored information in the chain DKZ is shifted one step further. The computer storage RS is switched in this case for operation as a "chain toward the right" because through row 211a the gates TKR are open as indicated by the legend in FIG. 1b, while the gate $TKR_1$ is not opened so that the storage is not connected as "great ring." The impulses from the generator TG are introduced in parallel into all the eighteen registers $RS_1$ to $RS_{18}$ and the product is shifted after every sequence of ten impulses one step to the right i.e. the content of each register is transferred into the next following register to the right. The first of each sequence of ten impulses from the chain ZWS travels via row 320 and line 401 to a delay unit $VZ_7$ and from there to a gate $T_{35}$, opened by row 211a, with a delay amounting to one-half of the interval between two consecutive pulses, i.e. between the first and scond shift impulse, so as to arrive at the element 0 of the register $RS_{18}$. In this manner a "9" will be stored in the register $RS_{18}$ at the end or completion of each ten-step pulse sequence i.e. of each decimal order shift of one step.

The final impulse from the decimal order counting chain DKZ stops via line 402 the generator TG and furthermore switches, via the delay unit $VZ_3$ and the gate $T_4$, also opened by row 211a as explained below, the control counter BZR one step further into a setting L0LL representing instruction No. 10 "rounding off" while simultaneously sending an impulse through column 119. It is to be added that by electromechanical means e.g. a switch cam-operated by the paper carriage or the control bar together with the setting of the arrangement for instruction No. 9 a contact 425 connected to row 211a of the distributor control matrix ST has been closed so that upon arrival of the impulse at the above mentioned gate $T_4$ the next following instruction No. 10 can be made effective.

Should it be desired to carry out a decimal order shift to the right of the stored information in the computer storage RS without a control from the paper carriage, then contact 425 remains open so that the machine will automatically stop after the decimal order shift has been carried out through "x" steps or order positions and the next instruction can be waited for.

INSTRUCTION NO. 10

Control Counter Setting L 0 L L

"Rounding Off"

After completion of the operation according to instruction No. 9, i.e. after "$x=a-1$" decimal order shifts of the product stored in the computer storage RS the digit value that has to be eliminated by the rounding operation is stored in the register $RS_1$. During this operation in which the rows 112 and 212 are conductive the registers of the computer storage RS are again connected as a "ring" because the gate TR are opened through the conductivity of row 212 as indicated by the legend in FIG. 1b. The transfers including the re-transfers from the register $RS_{17}$ to the register $RS_1$ are stored and are processed after the addition as has been explained already several times further above. The starting impulse through column 119 of the primary control matrix STW opens via line 311b the computer gates RT and initiates via line 311a an addition operation without any number value being stored in the contact matrix KF. As can be seen from FIG. 1c, during the read-out operation by the chain ZWS an impulse is delivered from the row 324 of the contact matrix KF via gate $T_{26}$, opened by row 212, to the opening portion of the flip-flop 312 of the computer gate $RT_1$ of the register $RS_1$. Hereby the flip-flop 312 is changed to opposite conditions and the computer gate $RT_1$ is closed. Since in the remaining rows of the contact matrix KF no digital value is stored no terminating impulses are delivered to the remaining computer gates $RT_2$ to $RT_{11}$ of the registers $RS_2$ to $RS_{11}$, respectively. Consequently, in the manner described further above, nine shift impulses are introduced into all the registers $RS_2$ to $RS_{17}$, while into the register $RS_1$ only four such impulses corresponding to the real digit value "5" have been introduced. Consequently the content of the register $RS_1$ has been changed stepwise by a digital value "5" (complementary "4"). The final impulse out of the chain ZWS stops via line 302 the generator TG and activates via gate $T_{27}$, opened by row 212, the transfer processing unit UV. The final signal delivered by this unit UV switches via gate $T_2$, opened by row 212, and via column 120 the control counter BZR into its next setting LL00 corresponding to instruction No. 11 and at the same time transmits a starting impulse to the electronic computer arrangement via column 119.

INSTRUCTION NO. 11

Control Counter Setting L L 0 0

"Decimal Order Shift Right by One Order Position of the Number Stored in RS in 'Chain' Connection"

In the setting for carrying out this instruction the computer storage RS is connected as "chain towards right" because through the conductivity of row 213, as indicated by the legend FIG. 1b the gates TKR are opened however the gate $TKR_1$ is not opened so that the connection is not a "great ring." The decimal order shift towards right is carried out again in the manner already explained in detail with respect to the instruction No. 9, however this time the shift takes place only in the amount of one step or one order position. The final impulse from the chain ZWS stops via line 302 the generator TG, however, this impulse is not transmitted in this case to any row of the primary control matrix STW so that no new setting of the programming arrangement is effected on the initiative of a part of the electronic arrangement.

Herewith the multiplication program is completed and the product is stored, after the necessary removal of the lowest order position digits and, if necessary after rounding of the result by elimination of the digit in the lowest order position, in complementary form in the computer storage RS and is thus ready for being printed.

The numerical example ending with the condition reached at the end of the operation according to instruction No. 8, is now continued herebelow to illustrate the operation according to the instructions No. 9–11.

| Shift Impulse No. | | Instruction No. 9 Setting L0L0 |
|---|---|---|
| 0 | in RS | 9 9 9 9 9 9 6 4 8 8 8 8 8 9 2 0 8 3 |
|  | in DKZ | 0 0 1 0 0 0 0 0 0 0 0 0 0 0 0 0 0 |
| 10 | in RS | 9 9 9 9 9 9 9 6 4 8 8 8 8 8 9 2 0 8 |
|  | in DKZ | 0 1 0 0 0 0 0 0 0 0 0 0 0 0 0 0 0 |
| 20 | in RS | 9 9 9 9 9 9 9 9 6 4 8 8 8 8 8 9 2 0 |
|  | in DKZ | 1 0 0 0 0 0 0 0 0 0 0 0 0 0 0 0 0 |
| 30 | in RS | 9 9 9 9 9 9 9 9 9 6 4 8 8 8 8 8 9 2 |

| | | Instruction No. 10 Setting LL0L |
|---|---|---|
| 0 | in RS | 9 9 9 9 9 9 9 9 9 9 9 9 9 9 9 9 4   +(real) |
| 9 | in RS | 9 9 9 9 9 9 9 9 9 6 4 8 8 8 8 9 2 |
|  | in RS | 9 8 8 8 8 8 8 8 8 5 3 7 7 7 7 7 8 6 |
|  | in Usp | 1 1 1 1 1 1 1 1 1 1 1 1 1 1 1   1 |
|  | in RS | 9 9 9 9 9 9 9 9 9 6 4 8 8 8 8 8 7 |

| | | Instruction No. 11 Setting LL0L |
|---|---|---|
| 0 | in RS | 9 9 9 9 9 9 9 9 9 6 4 8 8 8 8 8 7 |
| 10 | RS | 9 9 9 9 9 9 9 9 9 6 4 8 8 8 8 8 8 |
|  |  | Product, last digit cancelled, rounded, in complementary form. |

End of Multiplication

INSTRUCTION NO. 12

Control Counter Setting 0 0 0 0

"Printing"

This operation involves the transmission of the product to the printing arrangement, but with a simultaneous check as to whether the capacity of the printing arrangement is sufficient to accommodate the respective number.

When the paper carriage of the machine moves into the position "product" an impulse is transmitted from the control bar on the paper carriage via the input 100 and through a gate $T_{41}$, now open, into row 101 of the primary control matrix STW. Consequently the control counter BZR is changed to the setting 0000.

In the present case the row 201 of the distributor control matrix ST has been rendered conductive and opens the gates $T_1$, $T_{23}$, $T_{34}$ and $T_{38}$ as well as all the gates TR and TD as well as the gate TDK. The individual registers $RS_1$ and $RS_{18}$ of the computor storage RS are therefore each connected as a "ring" so that transfers from the element "9" of the individual registers are transmitted to the element "0" of the particular register. No impulses can reach the transfer storages U$sp$ because the gates T$u$ are not opened and remain closed. The drive motor of the accounting machine now starts its operational cycle so as to position mechanically the printing types e.g. a type wheel or wheels, and an impulse generator LS (FIG. 1c) is operated in synchronism therewith, for instance as a well-known photo-electric pulse generator operated by a light beam interrupted in synchronism with the stepwise movement of the type positioning means, transmits via the gates $T_{23}$ and $T_{34}$ and line 424' ten read-out impulses to the shift generators $VG_1$ to $VG_{18}$ of the registers $RS_1$ to $RS_{18}$, respectively, of the computer storage RS so that the information stored therein is once circulated in the different registers. In order to make sure that only ten impulses from the photo-electric generator LS operated by the printing apparatus D are introduced, the number of these pulses is checked by the counting chain ZWS since these impulses are also introduced into this chain via VG (ZWS). The transfer impulse in each of the registers of the computer storage RS appearing at the change of information storage "9" to information storage "0" triggers via the respectively associated open gate TD (FIG. 1d) a blocking oscillator S$p$ which energizes the respectively connected arresting magnet M so that the respectively associated forward moving type positioning element, not shown, is stopped. Consequently the particular printing type is arrested in that printing position which corresponds to that digital value which had been stored previously in the respectively associated register of the computer storage RS as will be further shown below in a chart illustrating the operation at the end of the explanation concerning instruction No. 12.

Simultaneously with the transmission of digital value signals to the printing arrangement D an examination takes place as to whether the number transfered from the computer storage RS perhaps is comprised of more order positions than can be accommodated by the capacity of the printing arrangement D. In the present example the computer storage RS has 17 calculating registers $RS_1$ to $RS_{17}$ and one extra transfer register $RS_{18}$ while the printing arrangement D is only provided for handling numbers comprising eleven order positions. Consequently, in order to avoid printing a wrong number, the registers $RS_{12}$ to $RS_{17}$ must not contain any digital value other than "0." Consequently it is necessary to check whether in view of the complementary form of values used in the computation operation, a value "9" is stored in each of the registers $RS_{12}$ to $RS_{17}$. For this purpose a checking unit $PR_1$ is provided which has a blocking input, a main input and an output. A line 301 which is connected with all the elements "8" of the registers $RS_{12}$ to $RS_{17}$ (only $RS_{17}$ being shown) is taken to the main input of $PR_1$. Inserted in line 301 is the gate TDK which is kept open by the row 201 of the distributor control matrix ST as indicated in the legend. Upon the transmision of a digital signal from the element "8" to the element "9" of any one of the registers $RS_{12}$ to $RS_{17}$, respectively, one impulse is applied to the main input of the checking unit $PR_1$. Simultaneously therewith the tenth read-out impulse leaving the counting chain ZWS arrives via lines 302 and 303 at the blocking input of the checking unit $PR_1$. Consequently, if in each of the registers $RS_{12}$ to $RS_{17}$ of the computers RS a "9" was stored before the introduction of the read-out impulses, then the impulses arriving via line 301 will coincide with the blocking impulses arriving via line 303. Consequently the checking unit $PR_1$ is blocked and no impulse arriving via line 301 is permitted to proceed. If, on the other hand, in any one of the registers $RS_{12}$ to $RS_{17}$ a value different from "9" (corresponding to the real value "0") had been stored, then the impulse from the element "8" of that particular register will arrive via line 301 earlier than the blocking impulse via line 303. Consequently the checking unit $PR_1$ acting like a gate will be open for such an impulse arriving via line 301 so that this impulse will travel via line 304 to a blocking oscillator relay A which is energized thereby and, being provided with self-holding means of known type, remains in energized condition and carries via one of its contacts current to the error relay F. The relay F, details of which do not form a part of this invention, is also caused to assume self-holding condition under the action of a cam-operated contact actuated by the mechanical main shaft after about one-half turn i.e. after completion of the read-out operation. In this manner and thereafter the relay F interrupts for the remainder of the operational cycle all the previously programmed instructions and prevents the printing of the incomplete number that is represented by the printing types in printing position. The machine stops and the error relay F indicates to the operator by a visible signal that the number stored in the computer storage RS cannot be printed because it has more order positions than can be accommodated by the capacity of the printing arrangement D.

On the other hand, if the number signals have been correctly transmitted to the printing arrangement D and the printing operation has been carried out, an impulse is introduced under the action of another cam-operated contact actuated by the motor shaft, to the input 100 and travels via a gate $T_{42}$, now open, and from there to row 102 of the primary control matrix STW whereby the control counter BZR is changed to setting 000L which corresponds to instruction No. 13.

In order not to render understanding of the above explanation unnecessarily difficult, the printing procedure has been described only in reference to the transmission of a positive value stored in the computer storage RS. However, since the arrangement and machine according to the invention is intended to be used also for computations extending into the range below "0," further arrangements or devices are required in order to print accordingly also resulting negative values, without necessitating a new or different instruction from the programming arrangement. For this purpose the highest-order calculating register $RS_{17}$ of the computer storage RS is associated and operatively connected with two gates $TA_1$ and $TS_1$, a bistable switch or flip-flop 305 which carries out the discrimination between positive and negative sign, a changeover switch SU (FIGS. 1c) and a complement forming arrangement KB. The gate $TA_1$ is connected by a line 306 with the output of the element "8" of the register $RS_{17}$, while the gate $TS_1$ is connected by a line 307 with the output of the element "9" of the same register.

As can be seen from FIG. 1d, during the computing operations the gate TA₁ has been opened from a row 203, according to the pertaining legend, in the case of an "addition," while the gate TS₁ has been opened from row 202, according to the pertaining legend, in the case of a "subtraction." An impulse passing through the gate TA₁ in the course of a computation switches the bistable flip-flop 305 into its left-hand position which causes, through means not shown, the ribbon in the printing arrangement D of the accounting machine to be switched to "black," or, in case no two-color ribbon is provided, a printing type for printing "+" or "pos." is brought into printing position whereby the indication is furnished in the printed voucher that the respective number is a positive number.

On the other hand, an impulse passing through the opened gate TS₁ switches the flip-flop 305 into its right-hand position in which the ribbon is switched to "red" or, instead of this, a printing type indicating "—" or "neg." is moved into printing position.

However, when the flip-flop 305 is in its right-hand position also the complement forming arrangement KB is activated and via line 426' and the hereby energized change-over switch relay SU is energized which is moved to its left-hand position shown in dotted lines so as to render the line 430 conductive. The arrangement KB acts in such a manner on the computer storage RS that the latter transmits any number value stored therein to the printing arrangement D in the form of the complement thereof. However, the value or number stored in the computer storage RS remains unchanged in its stored form even after the execution of the printing operation. The printing arrangement D is actually controlled by the arrangement KB through the line 428.

The change-over switch SU is a double-pole switch arranged in the line 424' (FIG. 1c.) When the flip-flop 305 is switched to its right-hand position, then the relay switch SU is energized via line 426' and the contacts thereof are moved into the second position shown in dotted lines so that impulses arriving from gate T₃₄ and originating in the photoelectric generator LS are not transmitted anymore to the shift generators VG₁ to VG₁₇ of the registers RS₁ to RS₁₇, respectively, of the computer storage RS, but they are transmitted via line 430 to the arrangement KB. Moreover, the flip-flop 305 also closes via line 427' a gate T₈₀ so that the connection, not shown, from row 201 (FIG. 1b) to the gates TD is blocked by the gate T₃₀ and the gates TD are not opened from row 201. Thus these gates TD are now again in closed condition.

Referring now to FIG. 5, the essential structure of the complement forming arrangement KB, indicated in FIG. 1d only by a block, is illustrated in greater detail. Its operation is the following: If a value below zero is to be transmitted from the computer storage RS to the printing arrangement D, then the first impulse from the photo-electric generator LS travels via line 424', the left-hand switch arm of switch SU in dotted position and line 430 to a bistable flip-flop 671 (FIG. 5) and switches the latter into its left-hand conductive condition. Hereby an asynchronously operating multivibrator 670 is started. The impulses generated thereby are transmitted via a shift impulse generator 675 to a counting chain composed of the elements 610 to 619 and acting as a read-out device. Also this counting chain or readout register is constructed in well-known manner as a magnetic register with a single winding per core as illustrated by FIG. 2. At the start of an operational cycle of the accounting machine a contact 674 operated by a cam on the main shaft is briefly closed slightly ahead of the arrival of the first impulse from the photo-electric generator LS. The impulse resulting from the closing of contact 674 arrives via generator 668 as storage signal in the register element 610 and reverses the magnetization thereof. Through the shift impulses from the shift generator 675 this stored information is then shifted stepwise from the register element 610 through the entire register as far as to the element 619. Upon the tenth impulse from generator 675 the stored information leaves the element 619 and arrives, on one hand, at the flip-flop 671 which thereby is switched into the opposite stable right-hand condition, whereby the multivibrator 670 is stopped, on the other hand the impulse from element 619 goes to an impulse amplifier 664 which now introduces from its output the received information into the register element 611.

Upon every individual transfer of an impulse from one register element to the next one, an output impulse is produced and delivered through the common output line 429. These ten impulses travel via a delay unit 662 to the shift generators VG₁–VG₁₈ of the corresponding registers of the computer storage RS whereby whatever digital value is stored therein is shifted ten steps forward, i.e. the entire stored numerical value is only circulated once through the respective registers because transfers are not being processed. Consequently, the first impulse from the photo-electric generator LS caused the arrangement KB to furnish ten pulses via the common output line 429 to all the registers of the computer storage RS.

As has been explained above, the gates TD are closed during the shifting operation in the read-out register 610–619. The impulse leaving the element 619 switches the flip-flop 671 back into its right-hand position whereby the gates TD are opened again. Hereafter, with a delay caused by the delay element 662, the last shift impulse passes through line 429 to the registers of the computer storage RS. This has the result that if e.g. upon the first signal shift through the register 610–619 in one or several registers of the computer storage RS a "0" was stored, this last impulse causes transfer of stored information from the last element 9 of the respective register to the first element 0 of the same register. However this output impulse travels via the corresponding open gate TD and the associated blocking oscillator SP to the arresting magnet M so so to stop the respective type-positioning element of the printing arrangement. After the first cycle of the read-out register 610–619 all values "0" are transmitted to the printing arrangement.

After this first operational cycle now the first information carrying element is the element 611 the magnetization of which has been reversed. Upon the arrival of the second impulse from the photo-electric generator LS via line 430 the starting operation described above is repeated. However the read-out register counts now only from the element 611 to the element 619 so that only nine shift impulses are transmitted via line 429 to the registers of the computer storage RS.

After such nine impulses again the gates TD are opened and the printing types associated with those registers which previously had stored therein the information "1," are now arrested in printing position. With every further step of the type-positioning bars and consequently with every further impulse furnished by the photo-electric generator LS the above procedure repeats so that with the tenth step i.e. after arrival of the tenth impulse from the photo-electric generator LS, the digital value "9" has been transmitted from the respective registers of the computer storage RS to the mechanical type-positioning elements of the printing arrangement D. Herewith the setting or positioning of the printing arrangement is terminated. However, in the same manner as above in the case of the transmission of a positive numerical value, it is now required that the originally stored numerical value in the computer storage RS is reinstated. This requires an 11th impulse which cannot be obtained from the photo-electric generator LS because this generator furnishes only a series of ten impulses according to the ten positioning steps of the printing type means. For this reason the main shaft of the mechanical section of the accounting machine is provided with a further cam for operating a contact which after completion of the setting of the printing arrangement sends an impulse via line 431 to the flip-flop 671. This 11th impulse causes one more signal shift through the elements 611–619 of the read-out register and thus reinstates the previous condition in the computer storage RS.

It can be seen that the complement forming arrangement KB has delivered 10 plus 10×9 i.e. a total of 100 shift impulses to each register of the computer storage RS. In this manner it is possible to transmit number values from magnetic or other counting stages which can count only in one direction, in complementary form into a printing arangement, the "0" being transmitted at the first step of the printing device, which is required in view of the conventional arrangement of the printing type on printing bars or printing wheels in the sequence 0 to 9.

After the termination of a printing operation the flip-flop 305 remains in that position or condition which prevailed at the beginning of the printing operation.

The following chart is intended to illustrate by way of a numerical example the operation of transmitting a numerical value, namely the product obtained by the operation according to instruction No. 11, from the computer storage RS to the printing arrangement D.

| LS-Impulses No. | | Instruction No. 12 Setting 0 0 0 0 |
|---|---|---|
| 0 | RS | 9 9 9 9 9 9 9 9 9 6 4 8 8 8 8 8 |
| 1 | RS | 0 0 0 0 0 0 0 0 0 7 5 9 9 9 9 9 |
|   | D  | 0 0 0 0 0 0 0 0 0 0 0 |
| 2 | RS | 1 1 1 1 1 1 1 1 1 8 6 0 0 0 0 0 |
|   | D  | 0 0 0 1 1 1 1 1 1 1 1 |
| 3 | RS | 2 2 2 2 2 2 2 2 9 7 1 1 1 1 1 1 |
|   | D  | 0 0 0 2 2 1 1 1 1 1 1 |
| 4 | RS | 3 3 3 3 3 3 3 3 3 0 8 2 2 2 2 2 |
|   | D  | 0 0 0 3 3 1 1 1 1 1 1 |
| 5 | RS | 4 4 4 4 4 4 4 4 4 1 9 3 3 3 3 3 |
|   | D  | 0 0 0 3 4 1 1 1 1 1 1 |
| 6 | RS | 5 5 5 5 5 5 5 5 5 2 0 4 4 4 4 4 |
|   | D  | 0 0 0 3 5 1 1 1 1 1 1 |
| 7 | RS | 6 6 6 6 6 6 6 6 6 3 1 5 5 5 5 5 |
|   | D  | 0 0 0 3 5 1 1 1 1 1 1 |
| 8 | RS | 7 7 7 7 7 7 7 7 7 4 2 6 6 6 6 6 |
|   | D  | 0 0 0 3 5 1 1 1 1 1 1 |
| 9 | RS | 8 8 8 8 8 8 8 8 8 5 3 7 7 7 7 7 |
|   | D  | 0 0 0 3 5 1 1 1 1 1 1 |
| 10 | RS | 9 9 9 9 9 9 9 9 9 6 4 8 8 8 8 8 |
|   | D  | 0 0 0 3 5 1 1 1 1 1 1 |
| in KF | | 0 0 0 3 5 1 1 1 1 1 1 |

INSTRUCTION NO. 13

Control Counter Setting 0 0 0 L
"Subtraction" and "Printing Check"

With this setting of the control counter BZR and of the distributor control matrix ST two operations can be carried out: either the control of a subtraction operation, or, as in the present example, the execution of a printing checking operation. The setting corresponding to the instruction "subtraction" is carried out either by actuating a subtraction key on the keyboard of the accounting machine or under control of the paper carriage as a jump order via gate $T_{42}$ and row 102 of the primary control matrix STW whereby the control counter BZR and the distributor control matrix ST are likewise adjusted.

The setting according to the instruction "printing checking" is, as mentioned above a consequence or follow-up of the instruction No. 12 "printing" and the corresponding setting is obtained by switching the control counter BZR into its next following position or setting.

The setting for "subtraction" differs from the setting for "printing checking" only in that in the second case the gate $T_2$ is opened through the switching of a contact 345 (FIG. 1b) connected with row 202 which has been rendered conductive by the setting of BZR according to the code symbol 0 0 0 L. Consequently, after carrying out the printing checking the control counter BZR is automatically switched into its next following setting.

It is to be noted that during the positioning of the printing types during the above-described printing operation the actuation of the photo-electric generator LS through the mechanical positioning element has resulted also in the transmission of pulses into the contact matrix KF so that the latter has been set so as to store therein the printed number in its real form. This number which now, irrespective of its positive or negative sign, is stored in the contact matrix KF is now subtracted from the complementary value stored in the computer storage RS provided that a positive number has been printed. This subtraction operation amounts actually to an addition in view of the complementary operating mode of the electronic computing arrangement. Therefore, if in a column of the contact matrix KF a "3" is set then in the registers (assigned to the same order position) of the computer storage RS a "6" must be stored provided that a positive number has been correctly transmitted to the printing arrangement D. The instruction for an operation to be carried out now reads: From the value "6" the value "3" is to be subtracted. This order is carried out by shifting the information "6" stored in a particular register three steps forward so that after the completion of this operation the information has been shifted to "9" (which is the real value "0"). During this subtraction operation the individual registers of the computer storage RS are switched each by the opening of the gates TR by row 202 as individual "rings." Since also through row 202 the gates Tu have been opened, transfers from the element "9" of a particular register to the element "0" of the same register are also transferred to the respectively associated transfer storage Usp. After the completion of the operation of subtracting the digital value stored in the contact matrix KF from the numerical value stored in the computer storage RS, these transfers are added respectively to the register of the next higher order position.

The starting impulse for this operation goes from row 102 via column 119 and input 344 to line 311a and to the generator TG so as to start the latter. The output impulses of the generator TG are transmitted in the manner described above to the chain ZWS. There output impulses are derived from the first nine shift impulses and are transmitted through delay unit $VZ_6$ and gate $T_{29}$, opened from row 202, and from there through line 310a with delay to the computer gates RT and thus to the shift generators $VG_1$ to $VG_{11}$ of the registers $RS_1$ to $RS_{11}$, respectively, of the computer storage RS. It is to be borne in mind that the computer gates have been opened at the beginning of the operation by the starting impulse via input 344 and line 311b. The first impulse from generator TG reads out the contact matrix KF through row 320 in order to determine whether in one or several of the different order columns of this matrix a "0" has been set, the second impulse checks via row 321 as to where a value "1" has been set etc. Whenever such a read-out impulse meets a set i.e. closed contact an impulse is delivered without delay via the corresponding column 330, 331 etc. to the respective computer gate RT of the register assigned to the same order position and closes this particular computer gate by switching the pertaining bistable flip-flop 312 to its opposite position. Further shift impulses from the chain ZWS cannot enter any more the particular register of the computer storage RS. The transfer of digital values set in the contact matrix KF in that particular order position to the corresponding register of the computer storage RS is herewith terminated. After the passage of nine shift impulses through the line 310 all the numerical values represented by closed contacts in the contact matrix KF are transmitted into the computer storage RS.

If, as has been explained at the end of the description of the operation according to instruction No. 12, in the computer storage RS a digital value smaller than "0" i.e. a negative number, has been stored which with the aid of the unit KB has been transmitted to the printing arrangement D, then the setting according to instruction No. 13 now causes the complement value of the number stored in the contact matrix KS to be added to the numerical value stored in the computer storage RS. This is necessary because in view of the complementary operation mode of the arrangement a value which is smaller than "0" i.e. negative is stored in the computer storage RS in its real form. The change in the operational mode of the computing arrangement is effected by the fact that according to FIG. 1b in the connection between the row 202 of the matrix ST and the gate $T_2$ a relay switch 432 is provided which is energized by the flip-flop 305 (FIG. 1d) provided that the latter is in its right-hand position. In that case the relay closes the contact and supplies current to a relay 433 (FIG. 1c) controlling a change-over switch cooperating with the gates TA-TS associated with the contact matrix KF. Whenever the relay 432 is energized also relay 433 is energized and switches the connection coming from row 201 from gate TS to gate TA. Consequently the gate TA is open during the read-out operation of the contact matrix KF and therefore, as has been explained above, the complement of the real number stored in the contact matrix KF is transmitted to the computer storage RS. In this manner the negative real number stored in the computer storage RS is shifted, in each of its registers, to the element representing "9" so that after the termination of the operation according to instruction No. 13, irrespective of whether at the beginning a negative or a positive number has been stored in the computer storage RS, a "9" is stored in every one of the registers of the storage RS.

The tenth pulse from the generator TG leaving the element "9" of the chain ZWS travels via line 302 and gate $T_{17}$ to the stop input of the generator TG so that the latter is disconnected. Simultaneously this tenth pulse travels via gate $T_{27}$ to the transfer processing unit UV and starts therein the operation which involves the processing of the transfer pulses stored in the various transfer storages U$sp$.

Such transfers can appear normally only in the case of a "subtraction" because in the case of "printing checking" the information in each register should only be shifted up to the position "9" (real value "0") unless an error has occurred.

In the form of a numerical example this operation, starting with the number printed according to the instruction No. 12, is illustrated by the following:

| Impulse No. | | Instruction No. 13 Setting 0 0 0 L |
|---|---|---|
|  | in KF | 0 0 0 3 5 1 1 1 1 1 1 |
| 0 | in RS | 9 9 9 9 9 9 9 9 9 6 4 8 8 8 8 8 8 |
| 9 | in RS | 9 9 9 9 9 9 9 9 9 9 9 9 9 9 9 9 9 |

INSTRUCTION NO. 14

Control Counter Setting 0 0 L 0

"Addition of Nines in All Order Positions"

This instruction is given only as a sequel to the instruction No. 13 "printing checking." If the transmission of the digital values to the printing arrangement D was satisfactory and correct, then the contents of the registers $RS_1$ to $RS_{11}$ of the computer storage RS have been supplemented so as to be now "9" (real value "0"). If, on the other hand, on account of instruction No. 13 a "subtraction" has been carried out, then the instruction No. 14 is not given since in the case of a setting for "subtraction" the gate $T_2$ was closed so that no impulse could pass through the gate $T_2$ whereby a switch of the control counter BZR to its next following setting would have been effected.

The setting according to instruction No. 14 serves the purpose of adding the value "9" in all the registers $RS_1$ to $RS_{17}$ in order to check whether the operation "addition" has been carried out properly and correctly. Therefore the instruction reads: "Add to the stored content of each of the registers $RS_1$ to $RS_{17}$ of the computer storage RS the value '9' and process thereafter the resulting or appearing transfers so that after the completion of these two partial operations the entire number stored in the computer storage RS is revolved or circulated once." The next following instruction No. 15 will then serve to check whether in each of the registers a "9" is stored whereby it will be decided whether all the previously executed printing and checking operations have been carried out correctly. The starting impulse for carrying out the operation according to instruction No. 14 is applied to the input 344 and from there through line 311$a$ to the generator TG an dopens simultaneously via line 311$b$ the computer gates RT by means of the respectively associated flip-flops 312. The first nine impulses from the lateral outputs of the chain ZWS travel via delay unit VZ6 (because the contact matrix KF is empty) to the shift generators $VG_1$ to $VG_{11}$ and $VG_{12}$ to $VG_{17}$ and from there to the associated resistors $RS_1$ to $RS_{11}$, respectively, and $RS_{12}$ to $RS_{17}$, respectively. As a result of the preceding operation all the resistors contain a stored value "9" provided that the electronic computing arrangement has functioned properly. After the addition of nine impulses to the contents of all the registers $RS_1$ to $RS_{17}$, respectively, the value "8" is stored therein and in each transfer storage U$sp$ a transfer is stored. The transfer which has left the register $RS_{17}$ of the storage RS has been transmitted via line 341 to the transfer storage U$sp$ of the register assigned to the lowest order position. The final output impulse from the chain ZWS i.e. the tenth impulse from the generator TG, stops via gate $T_{17}$ the generator TG and starts the processing of the transfers by activating via gate $T_{27}$ the transfer processing unit UV. The final output impulse from the unit UV passes through line 314 and gate $T_2$ and switches via column 120 of the primary control matrix STW the control counter BZR one step further into the setting 0 0 L L. Now in all the registers of the computer storage RS the value "9" should be stored.

The numerical examples given in connection with the instructions No. 12 and No. 13 will now be continued also in reference to the operation according to instruction No. 14. This operation is illustrated by the following chart:

| Impulse No. | | Instruction No. 14 Setting 0 0 L 0 | |
|---|---|---|---|
|  | in KF (empty) | 9 9 9 9 9 9 9 9 9 9 9 9 9 9 9 9 9 | +(regular) |
| 0 | in RS | 9 9 9 9 9 9 9 9 9 6 4 8 8 8 8 8 8 | |
| 9 | in RS | 9 8 8 8 8 8 8 8 8 8 8 8 8 8 8 8 8 | |
|  | in US | 1 1 1 1 1 1 1 1 1 1 1 1 1 1 1 1 1 | |
|  | in RS | 9 9 9 9 9 9 9 9 9 9 9 9 9 9 9 9 9 | 9= |

It can be seen that with the operation according to the just described instructions No. 13 and No. 14 a check is carried out automatically for every accounting operation, in order to show whether the printing operation was correct and whether the electronic arrangement has correctly subtracted, added and executed the transfer processing. The actual check in this respect is carried out in accordance with the following instruction No. 15.

INSTRUCTION NO. 15

Control Counter Setting 0 0 L L

"Decimal Order Shift Right of the Entire Content of the Storage RS in 'Great Ring' Connection, and checking on '9'"

The storage content of all the registers $RS_1$ to $RS_{17}$ to be checked is shifted stepwise by decimal order shift in the direction toward right, one after the other, into the register $RS_{18}$ in which every time a check is made as to whether the respective digital value is ="9" or whether it is larger or smaller than "9." For this purpose the computer storage RS is connected as a "chain in direction toward right and as a great ring", i.e. a transfer signal from the element "9" of any register is transmitted to the element "0" of the register assigned to the next lower decimal order. The transfer signal from the element "9" of the register $RS_1$ is transmitted to the element "0" of the register $RS_{18}$. For this purpose the gates TKR and the gate $TKR_1$ are all opened from row 204. During this operation the transfers are not stored because the gates Tu remain closed as can be seen from the legend next to row 204. The number of steps of this decimal order shift to the right is predetermined at the beginning of this operation from the control bar of the paper carriage by means of the decimal order counting chain DKZ. After the completion of each decimal order shift to the right in the amount of a step from one order position to the next following one the output signal from the chain ZWS acting as a stepping switch shifts the decimal order counting chain DKZ one step forward via gate $T_{24}$, and shift generator VG(DKZ). After completion of the preselected predetermined number of decimal order shifts the output signal of the element 18 of the decimal order counting chain DKZ stops via line 402 the generator TG. Provided that the stored content has been found to be correct as will be explained further below, no shift or jump instruction is applied to the control counter BZR, but the machine stops and is ready to receive a new sequence of instructions which may be initiated either manually or on account of the tabulation movement of the paper carriage.

The checking of the correctness of the stored information in each individual register of the storage RS is carried out, as already mentioned, in the register $RS_{18}$. This is done by taking the transfer signal from the element "8" to the element "9" via line 342 to the blocking input of the checking unit $PR_2$. If previously a "9" was stored in the register $RS_1$, then this transfer from element "8" to element "9" in the register $RS_{18}$ will concide with the output signal from the chain ZWS i.e. with the tenth counting impulse, at the checking unit $PR_2$. In this case, i.e. in the case of coincidence of the signal from the element "8" of $RS_{18}$ with the output signal from the chain ZWS the last-mentioned signal will not be able to pass through the checking unit $PR_2$. However if in any one register of the storage RS a value different from the value "9" is stored or was stored, then during the checking of this particular register $RS_{18}$ the impulse via 342 will not coincide with the output impulse from the chain ZWS so that this latter impulse will pass through the checking unit $PR_2$. This impulse travels through line 343, 422' to a gate $T_{11}$ (FIG. 1a) and thus into row 103 of the primary control matrix STW and causes thereby the control counter BZR to be switched back to the setting 0 0 L 0 corresponding to instruction number 14, without a starting signal being released through column 119 because the latter is not connected with row 103 as can be seen from FIG. 1a.

Consequently no starting impulse is transmitted to the input 344 of the electronic computing arrangement. However, in the distributor control matrix ST the row 203 has been rendered conductive through the setting of the control counter BZR. As indicated by the legend the error relay F is connected with the right-hand end of the row 203. This relay F responds after a delay of e.g. 4 msec. so that normally the entire checking operation according to the instruction No. 14 is carried out and terminated before the error relay F responds. If however during the checking concerning the value "9" i.e. during the operation according to instruction No. 15, an error should be detected in any one of the registers $RS_1$ to $RS_{17}$ of the computer storage RS, then a setting according to instruction No. 14 (without a new starting impulse) is re-established and since the instruction "addition of nines" is not started the error relay F is capable of responding after said delay and stops the machine. The operator is informed by an indicating signal that the machine has not properly carried out at least one or all of the operations according to instructions No. 12–15.

INSTRUCTION NO. 16

Control Counter Setting L L L 0

"Decimal Order Shift Left, in "Great Ring" Connection, Controlled by DKZ"

The operation according to this instruction is now described in this specification as a final instruction only because this operation is initiated exclusively under the one condition that a multiplication could not be carried out. As has been already mentioned in the explanation of the operation according to instruction No. 5, at the beginning of a multiplication a check is carried out as to whether the capacity of the computer storage RS is sufficient for completing a multiplication of two certain introduced factors. The answer to this question is given, at the termination of the left decimal order shift of the first factor into the highest order register of the storage RS, the output signal from the transfer storage $ULsp_1$ of the decimal order counting chain STK. If such output signal does not appear then it is proven that the two factors have too many order positions for permitting the execution of a multiplication. In that case a signal is issued by the checking unit $PR_2$ which signal passes through the delay unit $VZ_4$ and through gate $T_9$ into the row 115 of the primary control matrix STW. The control counter is accordingly set to L L L 0 and the row 215 is rendered conductive. Since row 115 delivers an impulse via column 119 into the electronic computing arrangement the instruction No. 16 is given as a sequel to the instruction No. 5.

The generator TG is started via line 311a, and the computer gates RT are opened via line 311b. The shift impulses to ZWS are also transmitted through gate $T_{34}$ and line 424' into the shift generators $VG_1$ to $VG_{18}$ and thereby into all the respectively associated registers $RS_1$ to $RS_{18}$, respectively. According to the legend in FIG. 1b the gates TKL and the gate $TKL_1$ are opened by row 215, and the first factor now stored in the highest order registers of the storage RS moves through the register $RS_{18}$ and gate $TKL_1$ into the register $RS_1$ of the computer storage RS. This procedure repeats until the output signal from the decimal order counter chain DKZ prevents further decimal shifts by stopping the generator TG via line 402. Since during the shifting of the first factor, according to instruction No. 5, from the lowest order registers to the highest order registers of the storage RS the decimal order counting chain DKZ has counted the number of shifts, the operation under instruction No. 16 results in transmitting this factor again completely to the lowest order registers of the storage RS because under these circumstances in accordance with the instructions No.

5 and No. 16 a total of 18 decimal order shifts have been carried out. Upon starting the operation according to instruction No. 16 also the blocking oscillator relay A (FIG. 1d) is actuated from row 215 as indicated by the pertaining legend, and as has been already mentioned before, this relay A responds with a certain delay unless it is prevented from acting in this manner.

The delay of the blocking oscillator relay A is so adjusted that e.g. the entire operation according to instruction No. 16 is completed before the blocking oscillator relay A responds. By the response of the blocking oscillator relay A the error relay F is activated and stops, after completion of the operation according to instruction No. 16, any further, even preselected or predetermined operations. The operator obtains an indication by a signal light or the like that a multiplication cannot be carried out with the factors now stored in the computing machine (the first factor in the lowest order registers of the computer storage RS, the second factor in the contact matrix KF). Now the operator may decide whether he would like to make one of the factors smaller by cancelling some of its digits in the lowest order position to such an extent that a multiplication is rendered possible, or whether he simply discontinues the entire operation by setting the entire machine back to zero and clearing out all values stored therein.

It will be understood that each of the elements described above, or two or more together, may also find a useful application in other types of a programming arrangement for controlling the sequence of a plurality of accounting machine operations differing from the types described above.

While the invention has been illustrated and described as embodied in a programming arrangement for controlling the sequence of a plurality of accounting machine operations in combination with an electro-mechanically operated electronically computing accounting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In combination with an electromechanically operated electronically computing accounting machine processing digital signals in parallel, a programming arrangement for controlling the sequence of a plurality of accounting machine operations, said programming arrangement including instruction register means selectably shiftable by application of control pulses between a plurality of settings defined by coded address symbols, respectively, and representing different controls, respectively, for computing, checking and printing operations as the case may be, primary programming control matrix means responding to a variety of control impulses representing in parallel digits of multi-order decimal numbers applied thereto and translating such control impulses into coded signal pulse combinations corresponding to said coded address symbols, respectively, for differently setting said instruction register means by such pulses accordingly, and distributor control matrix means controlled by said instruction register means for transmitting a variety of control signals respectively corresponding to different settings of said instruction register means so as to transmit corresponding controls for computing, checking and printing operations; asynchronous impulse generator means for furnishing impulse sequences causing the execution of said computing, checking and printing operations, respectively; and in plurality of control circuit means connected between said programming arrangement, said impulse generator means and the computing and printing portions of the accounting machine for controlling said computing, checking and printing operations, respectively, depending upon the transmission of said control signals.

2. In combination with an electromechanically operated electronically computing accounting machine processing digital signals in parallel, a programming arrangement for controlling the sequence of a plurality of accounting machine operations, said programming arrangement including instruction register means selectably shiftable by application of control pulses between a plurality of settings defined by coded address symbols, respectively, and representing different controls, respectively, for computing, checking and printing operations as the case may be, primary programming control matrix means responding to a variety of control impulses representing in parallel digits of multi-order decimals numbers applied thereto and translating such control impulses into coded signal pulse combinations corresponding to said coded address symbols, respectively, for differently setting said instruction register means by such pulses accordingly, and distributor control matrix means controlled by said instruction register means for transmitting a variety of control signals respectively corresponding to different settings of said instruction register means so as to transmit corresponding controls for computing, checking and printing operations; asynchronous impulse generator means for furnishing impulse sequences causing the execution of said computing, checking and printing operations, respectively; and a plurality of control circuit means connected between said programming arrangement, said impulse generator means and the computing and printing portions of the accounting machine for controlling said computing, checking and printing operations, respectively, depending upon the transmission of said control signals, and for transmitting control pulses derived from selected ones of said computing, checking and printing portions back to said programming arrangement for shifting the latter from an existing setting to a different one.

3. An arrangement as claimed in claim 2, wherein said plurality of control circuit means in connected with corresponding different outputs of said distributor control matrix and is also connected with corresponding different portions of the electronic computing means of the accounting means, for processing said control signals under the influence of signals from said electronic computing means in one of the following ways: transmitting the control signal as received, modifying the control signal and transmitting it in modified form, and storing the received control signal for transmittal later.

4. An arrangement as claimed in claim 3, wherein said control circuit means include checking means operatively connected with the electronic computing means for determining whether an instruction issued by said instruction register means is carried out correctly.

5. An arrangement as claimed in claim 4, wherein said checking means include a decimal order counting chain for counting the number of decimal orders of the second factor of a multiplication.

6. An arrangement as claimed in claim 5, wherein said checking means further include a second decimal order counting chain and having as many elements as there are portions assigned to different decimal orders in the electronic computer means, said two decimal order counting chains being connected for cooperating in counting the total number of decimal orders of both factors of a multiplication and for thus determining whether the capacity of the electronic computer means is sufficient for accommodating a product of such two factors 7. An electromechanically operated accounting machine, comprising, in combination, electronic computing means including a computing portion capable of processing digital signals representing in parallel digits of multi-order decimal numbers and a printing portion capable of printing in parallel said digits, said portion being operatively connected with each other, a programming arrangement for controlling the sequence of a plurality of accounting machine operations, said programming arrangement including instruction register means selectably shiftable by application of control pulses between a plurality of settings defined by coded address symbols, respectively, and representing different controls, respectively, for computing, checking and printing operations as the case may be, programming control matrix means responding to a variety of control impulses applied thereto and translating such control impulses into coded signal pulse combinations corresponding to said coded address symbols, respectively, for differently setting said instruction register means by such pulses accordingly, and distributor control matrix means controlled by said instruction register means for transmitting a variety of control signals respectively corresponding to different settings of said instruction register means so as to transmit corresponding controls for computing, checking and printing operations; asynchronous impulse generator means for furnishing impulse sequences causing the execution of said computing, checking and printing operations, respectively; and a plurality of control circuit means connected between said programming arrangement, said impulse generator means and said computing and printing portions of the accounting machine for controlling said computing, checking and printing operations, respectively, depending upon the transmission of said control signals, and for transmitting control pulses derived from selected ones of said computing, checking and printing portions back to said programming arrangement for shifting the latter from an existing setting to a different one.

8. An arrangement as claimed in claim 7, wherein said computing portion comprises a contact matrix having rows assigned to different digital values and rows assigned to different decimal order positions of numbers to be stored in said contact matrix by establishing selected connections between said rows and columns, a stepping chain operable by said impulse sequences from said impulse generator means for reading out by means of a sequence of read-out impulses digital information stored in said contact matrix and for transmitting such read-out digital information in parallel from said columns, a computer storage composed of a plurality of shift registers each comprising a predetermined number of elements in serial arrangement and assigned consecutively to different decimal order positions, a selected number of said shift registers being connected respectively to said columns for receiving said read-out digital information, and transfer processing means controlled by an output pulse from said stepping chain for transferring, in response to such output pulse, a digital value stored in at least one of said shift registers as a transfer to at least one other one of said shift registers.

9. An arrangement as claimed in claim 8, wherein said transfer processing means comprise a transfer processing control unit responsive to the last read-out pulse from said stepping chain, and a plurality of transfer storages respectively arranged between consecutive registers of said computer storage, said transfer storages being read out by said transfer processing control unit upon receiving said last read-out pulse, and said transfer processing control unit initiating, after completion of the transfer processing operation, a new sequence of said impulses from said impulse generator means for starting another read-out operation of said contact matrix by a sequence of read-out pulses from said stepping chain.

10. An arrangement as claimed in claim 9, wherein said transfer processing control unit is so constructed that it is caused to initiate said new sequence of read-out pulses whenever in its read-out of said transfer storages one of them is found having a transfer stored therein.

11. An arrangement as claimed in claim 10, wherein said transfer storages are so constructed that each of them stores an impulse leaving the last element of the respectively associated register and transmits this stored impulse, upon receiving a read-out impulse from said transfer processing control unit, as a signal representing the digital value "1" into the first element of the register assigned to the respectively next higher decimal order, and transmits simultaneously a starting impulse to said transfer processing control unit.

12. An arrangement as claimed in claim 8, wherein a first checking unit is operatively connected with said stepping chain and with said computer storage and so constructed that it prevents a printing operation whenever during the transmission of stored numerical information from said computer storage to the printing portions a signal representing a digital value different from "0" is transmitted to said first checking unit from a register assigned to a decimal order exceeding the capacity of the printing portion.

13. An arrangement as claimed in claim 9, wherein each of said registers of said computer storage is a chain of ferro-magnetic elements, a plurality of groups of switch means being associated and connected with said registers, respectively, each group comprising a first switch means and circuit means serving to connect, during input and read-out in parallel of digital values into and out of said registers, each individual register as a ring circuit for shifting information from the last element of the particular register back into the first element thereof, and second switch means and circuit means for transmitting, when said first gate means is closed, information from the last element of the particular register into the first element of the register assigned to the next following decimal order position.

14. An arrangement as claimed in claim 13, wherein said transfer storages are respectively connected with said first circuit means associated with the respectively associated register in such a manner that an information is transmitted to the respective transfer storage from the last element of the particular register when information is shifted from that last element to the first element of the particular register through said ring circuit.

15. An arrangement as claimed in claim 13, wherein each of said groups of switch means comprises first, second and third gate means, of which at any time one is open while the other two are closed.

16. An arrangement as claimed in claim 15, wherein in each of said groups said first gate means and circuit means, when said first gate means is open, connects the last element of the particular register with the first element thereof, and wherein said second gate means, when open, establishes connection between the last element of the particular register to the first element of the register assigned to the next higher decimal order position, while said third gate means, when open, establishes connection between the last element of the particular register and the first element of the register assigned to the next lower decimal order position.

17. An arrangement as claimed in claim 16 wherein a group of gate means is associated and connected with the register assigned to the highest decimal order position, said group comprising first gate means and circuit means for establishing, when said first gate is open, connection between the last element of the particular register with the last element thereof, second gate means and circuit means for establishing, when said second gate means is open, connection between the last element of the register assigned to the lowest decimal order position and the first element of the register assigned to the highest decimal order position, and third gate means and circuit means for establishing, when said third gate means is open, connection between the last element of the register assigned to the highest decimal order position and the first element of the register assigned to the lowest order position.

18. An electromechanically operated accounting machine, comprising, in combination, electronic computing means including a computing portion and a printing portion operatively connected with each other, said printing portion comprising a plurality of adjustable printing type means respectively assigned to different decimal order positions and mechanical type positioning means for stepwise moving said type means into respective printing positions, and stepping pulse generating means operated in synchronism with said type positioning means for furnishing impulses respectively corresponding to different printing positions of said printing type means, said computing portion comprising a contact matrix having rows assigned to different digital values and rows assigned to different decimal order positions of numbers to be stored in said contact matrix by establshing selected connections between said rows and columns, a stepping chain operable by said stepping pulse generating means for reading out by means of a sequence of read-out impulses digital information stored in said contact matrix and for transmitting such read-out information in parallel from said columns, a computer storage composed of a plurality of shift registers comprising each a predetermined number of elements in serial arrangement and assigned consecutively to different decimal order positions, a selected number of said shift registers being connected respectively to said columns for receiving said digital information and electromagnetic means for stopping any one of said printing type means in a selected printing position in response to application thereto of an output pulse issued by the last element of the register assigned to the same decimal order position as the particular printing type means, a programming arrangement for controlling the sequence of a plurality of accounting machine operations, said programming arrangement including instruction register means selectably shiftable by application of control pulses between a plurality of settings defined by coded address symbols, respectively, and representing different controls, respectively, for computing, checking and printing operations as the case may be, primary control matrix means responding to a variety of impulses applied thereto and translating such impulses into coded signal pulse combinations corresponding to said coded address symbols, respectively, for differently setting said instruction register means by such pulses accordingly, and distributor control matrix means controlled by said instruction register means for transmitting a variety of control signals respectively corresponding to different settings of said instruction register means so as to transmit corresponding controls for computing, checking and printing operations; impulse generator means for furnishing impulse sequences causing the execution of said computing, checking and printing operations, respectively; and a plurality of control circuit means connected between said programming arrangement, said impulse generator means, stepping pulse generating means and said computing and printing portions of the accounting machine for controlling said computing, checking and printing operations, respectively, depending upon the transmission of said control signals, and for transmitting control pulses derived from selected ones of said computing, checking and printing portions back to said programming arrangement for shifting the latter from an existing setting to a different one.

19. An arrangement as claimed in claim 18, comprising means for carrying out the mechanical printing of a numerical value stored in said computer storage in complementary form by revolving this storage once therein under the action of ten of said impulses furnished by said stepping pulse generating means and introduced into all the registers of said computer storage while excluding transfer processing, and means for simultaneously positioning said type printing means accordingly and for storing a corresponding number in said contact matrix, in such a manner that a subsequent subtraction of the number stored in said contact matrix from the complementary value stored in said computer storage, initiated automatically by said printing portion, results in setting said computer storage to "0" position.

20. An arrangement as claimed in claim 18, wherein a complement forming means is provided for carrying out the printing of a real number value stored in said computer storage, under control of ten of said impulses furnished by said stepping pulse generating means, in such a manner that said printing type means are positioned corresponding to the complement of the number value stored in said computer storage.

21. An arrangement as claimed in claim 8, wherein a checking gate means is connected with the highest order register of said computer storage for receiving therefrom, when the latter reaches a storage condition representing "0," a gate blocking impulse, said checking gate means being further connected with said stepping chain for receiving an impulse derived from the tenth of said read-out impulses, said checking gate means having an output for passing on said last mentioned impulse unless being blocked by said blocking impulse, an error relay means for indicating an error and for stopping further operations being connected to said output of said checking gate means for being actuated thereby whenever said impulse is passed on, so as to check whether the information contained in said computer storage is "0."

22. An arrangement as claimed in claim 8, wherein the highest order register of said computer storage is connected with said stepping chain, for the purpose of multiplying a first factor composed of digital values stored in the higher registers, respectively, of said storage computer, and a second factor stored in said contact matrix, in such a manner that after processing the storage content of said highest order register said stepping chain is stopped and a signal is transmitted to said primary control matrix for setting said programming arrangement for giving the instruction "decimal order shift."

23. An arrangement as claimed in claim 22, comprising means for transmitting, for the purpose of multiplication, said first factor from said contact matrix to the lowest order registers of said computer storage and for then shifting by repeated decimal order shift said first factor into the highest order registers of said computer storage, and including a decimal order counting chain being constructed and connected in such a manner that before the start of said repeated decimal order shifts a signal is stored in the second element of said decimal order counting chain, and that this signal is shifted through said counting chain, in synchronism with said decimal order shift, stepwise from element to element.

24. An arrangement as claimed in claim 22, in which said highest order register of the computer storage is cooperatively connected with said stepping chain via said checking gate means in such a manner that, in the case of a value greater than "0" being stored in said highest order register, said last impulse derived from the tenth of said read-out impulses and furnished by said stepping chain after completion of a decimal order shift is transmitted to said primary control matrix for setting said programming arrangement for giving the instruction "repeated addition."

25. An arrangement as claimed in claim 23, wherein a decimal order counting chain is provided for counting the number of decimal order shifts, said counting chain issuing a final impulse when its highest or last element is reached by said counting, said final pulse being transmitted through said control circuit means to said primary control matrix for setting said programming arrangement for causing a "repeated addition" in the form of one final processing of the storage content of said highest order register of said computer storage.

26. An arrangement as claimed in claim 8, the selectable connections are provided between said rows of said contact matrix and said stepping chain, control means being provided for selecting said connections in such a manner that alternatively, for the purpose of additions and subtractions, said rows can be read out by a series of unidirectional shifts of impulses through said chain, in a sequence corresponding to "0–9" as well as in a sequence corresponding to "9–0."

27. An arrangement as claimed in claim 26, wherein each element of said stepping chain has a first and a second output, the group of said first and second outputs being alternatively operable, a first control means being provided for said group of first outputs for causing read-out of said rows in one of said sequences, and second control means being provided for said group of second outputs for causing read-out of said rows in the other one of said sequences.

28. An arrangement as claimed in claim 8, including a first change-over switch means connected to elements of the highest order calculating register of said computer storage for being switched by impulses from said elements between two alternative positions for causing in this particular register a transition from a complementary value to a real digit value, a complement forming unit being connected with said change-over switch means for being controlled thereby and connected additionally with the "0" element of this register for being prepared by an impulse from this element for causing transfer of complementary number signals from said computer storage to said printing portion depending upon the control by said change-over switch means.

29. An arrangement as claimed in claim 28, including a second change-over switch means controlled by said first change-over switch means for being moved together with the activation of said complement forming unit into a predetermined position, said change-over switch means being connected between said stepping pulse generating means and said computer storage for transmitting, when in said predetermined position, the impulses furnished by said stepping pulse generating means as control impulses to the input of said complement forming unit, while at the same time connecting the output of said complement forming unit with all the inputs of said registers of said computer storage.

30. An arrangement as claimed in claim 29, including in said printing portion a plurality of type arresting electromagnets respectively associated and connected with the registers of said computer storage assigned to different decimal order positions, and a plurality of printing gates respectively interposed between the outputs of said registers and said printing gates, respectively, said printing gates being controlled by said complement forming unit so as to be closed when the latter is activated.

31. An arrangement as claimed in claim 30, wherein said complement forming unit is so constructed that every impulse applied thereto from said stepping pulse generating means causes delivery of an impulse sequence into said registers of said computer storage, the first impulse sequence initiated by the first impulse comprising ten impulses, while the subsequent impulse sequences initiated by subsequent impulses from said stepping pulse generating means comprise nine impulses each, the last impulse of each sequence being applied to said printing gates for temporarily opening the latter.

32. An arrangement as claimed in claim 31 including means controlled by the mechanical operating portion of the machine for applying, after the completion of a sequence of impulses from said stepping pulse generating means, but before termination of the printing operation, an eleventh impulse to said complement forming unit for causing the latter to deliver another sequence of nine impulses so that the total number of shift impulses introduced into the registers of said computer storage by said complement forming unit amounts to 100 impulses whereby after this operation the number value stored in said computer storage is re-established.

33. An arrangement as claimed in claim 31, wherein said complement forming unit comprises a ten-element magnetic counting chain, the first element of which is magnetically reversed when said complement forming unit is activated under control of said first changeover switch means, and a multivibrator which is started by the first of said impulses from said stepping pulse generating means and causes information stored in said first element of said magnetic counting chain by said first impulse to be shifted stepwise through said magnetic counting chain.

34. An arrangement as claimed in claim 33, including means for stopping said multivibrator by an impulse leaving the last element of said magnetic counting chain, and for causing said impulse from said last element to reverse the magnetization of the second element of said magnetic counting chain so that after the first passage of information through said chain the latter is prepared for delivering at its output sequences of nine impulses.

35. An arrangement as claimed in claim 28, including a connection leading from the "0" element of the highest order register of said computer storage to said first changeover switch means for being switched by an impulse from said "0" element back into a position in which said complement forming unit is switched off.

36. An arrangement as claimed in claim 28 including indicating means connected with said first switch-over means for indicating whether a numerical information transmitted from said computing portion to said printing portion is positive or negative.

37. An arrangement as claimed in claim 36, a first control gate arranged in connection with said first changeover switch means, said first control gate being normally closed, but requiring to be opened when said indicating means are to indicate a negative number value, and said first control gate being open by a signal derived from said distributor control matrix when the latter issues the instruction "subtraction."

38. An arrangement as claimed in claim 36, a second control gate arranged in connection with said first changeover switch means, said second control gate being normally closed, but requiring to be opened when said indicating means are to indicate a positive number value, and said second control gate being open by a signal derived from said distributor control matrix when the latter issues the instruction "addition."

39. An arrangement as claimed in claim 28, wherein said first change-over switch means is a bistable flip-flop device.

40. An arrangement as claimed in claim 18, comprising a first decimal order counting chain and a second decimal order counting chain and checking gate means which are so interconnected and connected with said computer storage and with said stepping chain that during decimal order shifts of a first multiplication factor originally stored in the lowest order registers of said computer storage into the highest order registers thereof said decimal order counting chains are shifted one step per decimal order shift in the amount from one order to the next one, and that said checking gate means stops said stepping chain from causing said decimal order shifts when the digit in the relatively highest order position of a particular number has been shifted into the highest order register of said computer storage.

41. An arrangement as claimed in claim 40, including means for blocking said checking gate means when in the course of decimal order shifts a value "0" is transmitted into said highest order register upon the tenth impulse from said stepping chain so that said tenth impulse finds said checking gate means blocked upon its arrival so 42. An arrangement as claimed in claim 40, including means for preventing blocking of said checking gate means as long as a digital value different from "0" is stored in the highest order register in the course of said decimal order shifts so that the tenth impulse from said stepping chain is passed on by said checking gate means, an excess storage unit being connected with one of said decimal order counting chains and connected for being read out by said tenth impulse passed on through said checking gate means.

43. An arrangement as claimed in claim 42, wherein said excess storage unit being so constructed that when stored excess information is read out by said tenth impulse, a control pulse is transmitted to said primary control matrix for setting said programming arrangement for issuing the instruction "multiple addition."

44. An arrangement as claimed in claim 25, wherein, in the case of a multiplication operation, the control elements are so positioned by the output impulse from said stepping chain via said programming arrangement that an impulse indicating the storage of "0" in the highest order register of said computer storage causes termination of the multiplication and initiates the issue of a "last orders cancelling" instruction, provided that means for carrying out such instruction have been preset.

45. An arrangement as claimed in claim 44, wherein a plurality of order number selecting gates are associated and connected with one of said decimal order counting chains, one of said selecting gates being opened at the end of a multiplication under control of the paper carriage so that the final output pulse from said selected decimal order counting chain is transmitted to that element of this chain which is respectively associated and connected with the particular opened selecting gate, while said final output impulse is also transmitted to said programming arrangement for setting the latter for the corresponding instruction.

46. An arrangement as claimed in claim 45, wherein a plurality of control input gates leading into said primary control matrix are provided and so constructed and connected that, depending upon the type of order cancelling instruction derived from the paper carriage, different ones of said control input gates are opened so that in the case of an instruction "cancel no digit" the machine is stopped; in the case of an instruction "cancel the last digit" the number is rounded by adding "5" to the last digit and the number stored in said computer storage is subjected to a decimal order shift towards right in the amount of one order position, while in the case of an instruction "cancel y orders" the number stored in said computer storage is subjected to y−1 decimal order shifts towards right, then rounded by adding "5" to the last digit, and subjected to another one-step decimal order shift towards right, said operations being controlled by said stepping chain via said programming arrangement depending upon which element of said decimal order counting chain has been preselected.

47. An arrangement as claimed in claim 46, wherein said decimal order counting chain is so constructed that it permits the execution of decimal order shifts until from its highest chain element an output signal is transmitted to said primary control matrix whereby said programming arrangement is set for issuing the instruction "Rounding."

48. An arrangement as claimed in claim 47, wherein a rounding control gate is connected between a selected row of said contact matrix and the lowest order register of said computer storage so that upon the instruction "Rounding" during a read-out of said contact matrix the digital value "5" is added into said lowest order register, whereafter a transfer processing operation is initiated, a transfer processing control unit being provided for issuing, after said transfer processing operation, a final signal which causes a single one-step decimal order shift towards right.

49. An arrangement as claimed in claim 8, wherein said columns of said contact matrix are connected with a common checking conductor for carrying an error indicating impulse when, upon reading out said contact matrix while no number value has been stored therein, a contact between a row and a column is in conductive condition, an error indicating and evaluating means being connected to said checking conductor so as to respond to such error indicating impulse whenever transmitted.

50. An arrangement as claimed in claim 8, including a checking gate so connected with said computing portion that it remains open and capable of passing an error signal if after introduction of a number value into said contact matrix and upon reading out said contact matrix at least one of said columns is not carrying current.

51. An arrangement as claimed in claim 50, wherein computer gates are respectively arranged at the inputs of a plurality of registers of said computer storage, respectively, and a flip-flop controlled by the respective column being provided for each of said computer gates for controlling the latter, said checking gate being connected with all of said flip-flops in such a manner that said flip-flops in that position, which they have before the application of a read-out impulse from the respective column, keep the respectively associated computer gate open so that the last applied read-out impulse is capable of passing through said checking gate as an error sequel provided that at least one flip-flop has not been switched by a read-out impulse to computer gate closing position, and an error indicating and evaluating means being connected to said checking gate so as to respond to such error indicating impulse whenever transmitted.

References Cited by the Examiner
UNITED STATES PATENTS

| | | | |
|---|---|---|---|
| 2,927,732 | 3/1960 | Rinder et al. | 235—157 |
| 2,941,188 | 6/1960 | Flechtner et al. | 340—172.5 |
| 3,112,394 | 11/1963 | Close et al. | 340—172.5 |

ROBERT C. BAILEY, *Primary Examiner.*

WALTER W. BURNS, Jr., MALCOLM A. MORRISON, *Examiners.*

M. POKOTILOW, W. M. BECKER, *Assistant Examiners.*